US009627699B2

United States Patent
Finnerty et al.

(10) Patent No.: US 9,627,699 B2
(45) Date of Patent: *Apr. 18, 2017

(54) GASEOUS FUEL CPOX REFORMERS AND METHODS OF CPOX REFORMING

(71) Applicant: Watt Fuel Cell Corp., Mount Pleasant, PA (US)

(72) Inventors: Caine M. Finnerty, Port Washington, NY (US); Paul DeWald, Scottdale, PA (US)

(73) Assignee: Watt Fuel Cell Corp., Mount Pleasant, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/534,345

(22) Filed: Nov. 6, 2014

(65) Prior Publication Data

US 2015/0144841 A1    May 28, 2015

Related U.S. Application Data

(60) Provisional application No. 61/900,543, filed on Nov. 6, 2013.

(51) Int. Cl.
*B01J 7/00* (2006.01)
*C01B 3/36* (2006.01)
(Continued)

(52) U.S. Cl.
CPC ........... *H01M 8/0618* (2013.01); *B01J 4/001* (2013.01); *B01J 4/002* (2013.01); *B01J 4/005* (2013.01);
(Continued)

(58) Field of Classification Search
CPC ......................... C01B 3/386; C01B 2203/0261
See application file for complete search history.

(56) References Cited

U.S. PATENT DOCUMENTS 2,945,077 A    7/1960   Polk
3,518,284 A    6/1970   Foster
(Continued)

FOREIGN PATENT DOCUMENTS

EP    1382382 A1    1/2004
EP    1787950 A2    5/2007
(Continued)

OTHER PUBLICATIONS

Caine Finnerty, Geoff A. Tompesett, Kevin Kandall, R. Mark Ormerod, SOFC System with Integrated Catalytic Fuel Processing. Accepted Nov. 24, 1999, pp. 459-463, vol. 88 (2000), Journal of Power Sources, Staffordshire, England.
(Continued)

*Primary Examiner* — Imran Akram
(74) *Attorney, Agent, or Firm* — Dilworth & Barrese, LLP.; Michael J. Musella

(57) ABSTRACT

A gaseous fuel catalytic partial oxidation (CPOX) reformer can include a plurality or an array of spaced-apart CPOX reactor units, each reactor unit including an elongate tube having a wall with internal and external surfaces, the wall enclosing an open gaseous flow passageway with at least a portion of the wall having CPOX catalyst disposed therein and/or comprising its structure. The catalyst-containing wall structure and open gaseous flow passageway enclosed thereby define a gaseous phase CPOX reaction zone, the catalyst-containing wall section being gas-permeable to allow gaseous CPOX reaction mixture to diffuse therein and hydrogen-rich product reformate to diffuse therefrom. At least the exterior surface of a CPOX reaction zone of a CPOX reactor unit can include a hydrogen barrier. The gaseous fuel CPOX reformer also can include one or more igniters, and a source of gaseous reformable fuel.

25 Claims, 11 Drawing Sheets

(51) Int. Cl.
*H01M 8/0612* (2016.01)
*B01J 19/24* (2006.01)
*B01J 12/00* (2006.01)
*B01J 4/00* (2006.01)
*C01B 3/32* (2006.01)
*C01B 3/38* (2006.01)

(52) U.S. Cl.
CPC ......... *B01J 12/007* (2013.01); *B01J 19/2425* (2013.01); *C01B 3/323* (2013.01); *C01B 3/386* (2013.01); *B01J 2219/002* (2013.01); *B01J 2219/0006* (2013.01); *B01J 2219/00006* (2013.01); *B01J 2219/00058* (2013.01); *B01J 2219/00069* (2013.01); *B01J 2219/00135* (2013.01); *B01J 2219/00159* (2013.01); *B01J 2219/00213* (2013.01); *B01J 2219/00234* (2013.01); *B01J 2219/00238* (2013.01); *B01J 2219/2401* (2013.01); *C01B 2203/0261* (2013.01); *C01B 2203/1035* (2013.01); *C01B 2203/1223* (2013.01); *C01B 2203/1229* (2013.01); *C01B 2203/1235* (2013.01); *C01B 2203/1241* (2013.01); *C01B 2203/1247* (2013.01); *C01B 2203/141* (2013.01); *C01B 2203/16* (2013.01); *C01B 2203/1604* (2013.01)

(56) References Cited

U.S. PATENT DOCUMENTS

| | | | |
|---|---|---|---|
| 3,560,167 A | 2/1971 | Bruckner et al. | |
| 4,588,659 A | 5/1986 | Abens et al. | |
| 4,751,057 A | 6/1988 | Westerman | |
| 4,894,205 A | 1/1990 | Westerman et al. | |
| 5,149,156 A | 9/1992 | Kleefeldt | |
| 5,149,516 A | 9/1992 | Han et al. | |
| 5,447,705 A | 9/1995 | Petit et al. | |
| 5,527,631 A | 6/1996 | Singh et al. | |
| 5,573,737 A | 11/1996 | Balachandrean et al. | |
| 5,596,514 A | 1/1997 | Maher, Jr. et al. | |
| 5,648,582 A | 7/1997 | Schmidt et al. | |
| 5,670,269 A * | 9/1997 | Hamada | B01J 8/0207 422/625 |
| 5,690,763 A | 11/1997 | Ashmead et al. | |
| 5,846,641 A * | 12/1998 | Abeles | B01D 53/228 428/116 |
| 5,980,840 A * | 11/1999 | Kleefisch | B01D 53/885 252/373 |
| 6,033,793 A | 3/2000 | Woods et al. | |
| 6,284,398 B1 | 9/2001 | Kiryu | |
| 6,296,814 B1 | 10/2001 | Bonk et al. | |
| 6,379,586 B1 | 4/2002 | Zeng et al. | |
| 6,383,469 B1 | 5/2002 | Lamla et al. | |
| 6,383,670 B1 | 5/2002 | Edlund et al. | |
| 6,402,989 B1 | 6/2002 | Gaffney | |
| 6,403,049 B1 | 6/2002 | Van Keulen et al. | |
| 6,447,940 B1 | 9/2002 | Ueda | |
| 6,458,334 B1 | 10/2002 | Tamhankar et al. | |
| 6,465,118 B1 | 10/2002 | Dickman et al. | |
| 6,488,838 B1 | 12/2002 | Tonkovich et al. | |
| 6,488,907 B1 | 12/2002 | Barnes et al. | |
| 6,492,050 B1 | 12/2002 | Sammes | |
| 6,521,204 B1 | 2/2003 | Borup et al. | |
| 6,565,817 B1 | 5/2003 | Kiryu | |
| 6,576,359 B2 | 6/2003 | Fronk | |
| 6,585,940 B2 | 7/2003 | Abe et al. | |
| 6,641,625 B1 | 11/2003 | Clawson et al. | |
| 6,641,795 B2 | 11/2003 | Abe | |
| 6,656,623 B2 | 12/2003 | Holmes et al. | |
| 6,667,123 B2 | 12/2003 | Yu | |
| 6,673,270 B1 | 1/2004 | De Jong et al. | |
| 6,692,707 B1 | 2/2004 | Hirabayashi | |
| 6,699,609 B2 | 3/2004 | Kotani et al. | |
| 6,702,960 B1 | 3/2004 | Schaddenhorst et al. | |
| 6,726,853 B2 | 4/2004 | Okado et al. | |
| 6,749,958 B2 | 6/2004 | Pastula et al. | |
| 6,770,106 B1 | 8/2004 | Okamoto et al. | |
| 6,783,742 B2 | 8/2004 | Bentley et al. | |
| 6,790,247 B2 | 9/2004 | Childress et al. | |
| 6,790,431 B2 | 9/2004 | Wang et al. | |
| 6,800,387 B2 | 10/2004 | Shimada et al. | |
| 6,833,208 B2 | 12/2004 | Kotani et al. | |
| 6,833,536 B2 | 12/2004 | Shigeura | |
| 6,869,456 B2 | 3/2005 | Salemi et al. | |
| 6,872,379 B2 | 3/2005 | Zahringer et al. | |
| 6,878,667 B2 | 4/2005 | Gaffney et al. | |
| 6,881,508 B2 | 4/2005 | Penev | |
| 6,887,436 B1 | 5/2005 | Fisher et al. | |
| 6,887,456 B2 | 5/2005 | Xu et al. | |
| 6,921,596 B2 | 7/2005 | Kelly et al. | |
| 6,932,950 B1 | 8/2005 | Guetlhuber | |
| 6,984,371 B2 | 1/2006 | Zhao et al. | |
| 7,001,867 B2 | 2/2006 | Jin et al. | |
| 7,037,349 B2 | 5/2006 | Dauer et al. | |
| 7,048,897 B1 | 5/2006 | Koripella et al. | |
| 7,070,633 B2 | 7/2006 | Okada et al. | |
| 7,070,752 B2 | 7/2006 | Zeng et al. | |
| 7,090,826 B2 | 8/2006 | Jiang et al. | |
| 7,101,531 B2 | 9/2006 | Kamijo | |
| 7,115,233 B2 | 10/2006 | Okada et al. | |
| 7,118,717 B2 | 10/2006 | Shore | |
| 7,132,184 B2 | 11/2006 | Ogino et al. | |
| 7,147,836 B2 | 12/2006 | Ebert et al. | |
| 7,147,946 B2 | 12/2006 | Kawasumi et al. | |
| 7,156,886 B2 | 1/2007 | Nakamura et al. | |
| 7,189,371 B2 | 3/2007 | Iwasaki | |
| 7,192,458 B1 | 3/2007 | Harness et al. | |
| 7,232,352 B2 | 6/2007 | Splaine | |
| 7,247,258 B2 | 7/2007 | Jung et al. | |
| 7,285,247 B2 | 10/2007 | Smaling et al. | |
| 7,294,421 B2 | 11/2007 | Noetzel et al. | |
| 7,323,148 B2 | 1/2008 | Shah et al. | |
| 7,328,691 B2 | 2/2008 | Hataura et al. | |
| 7,335,432 B2 | 2/2008 | Koripella | |
| 7,344,572 B2 | 3/2008 | Yamamoto | |
| 7,344,687 B2 | 3/2008 | Oi et al. | |
| 7,364,812 B2 | 4/2008 | Taylor et al. | |
| 7,368,482 B2 | 5/2008 | Basini et al. | |
| 7,422,810 B2 | 9/2008 | Venkataraman et al. | |
| 7,490,580 B2 | 2/2009 | Hanai et al. | |
| 7,578,861 B2 | 8/2009 | Kah et al. | |
| 7,585,810 B2 | 9/2009 | Chen et al. | |
| 7,625,414 B2 | 12/2009 | Nougier et al. | |
| 7,632,320 B2 | 12/2009 | Tonkovich et al. | |
| 7,691,509 B2 | 4/2010 | Han et al. | |
| 7,704,618 B2 | 4/2010 | Venkataraman et al. | |
| 7,736,399 B2 | 6/2010 | Ravenda et al. | |
| 7,846,599 B2 | 12/2010 | Ballantine et al. | |
| 7,858,214 B2 | 12/2010 | Kelly et al. | |
| 7,888,278 B2 | 2/2011 | Rapier et al. | |
| 7,901,814 B2 | 3/2011 | Venkataraman et al. | |
| 7,976,787 B2 | 7/2011 | England et al. | |
| 7,985,506 B2 | 7/2011 | Lee et al. | |
| 7,985,509 B2 | 7/2011 | Kim et al. | |
| 7,998,456 B2 | 8/2011 | Van Dijk et al. | |
| 8,034,504 B2 | 10/2011 | Tsunoda et al. | |
| 8,062,800 B2 | 11/2011 | Cho et al. | |
| 8,142,941 B2 | 3/2012 | Bitoh | |
| 8,158,289 B2 | 4/2012 | Cutright et al. | |
| 8,173,310 B2 | 5/2012 | Son | |
| 8,241,600 B1 | 8/2012 | Berry et al. | |
| 8,257,669 B2 | 9/2012 | Jankowski | |
| 8,277,524 B2 | 10/2012 | Keegan et al. | |
| 8,298,711 B2 | 10/2012 | Yanase et al. | |
| 8,304,122 B2 | 11/2012 | Pushusta et al. | |
| 8,318,363 B2 | 11/2012 | Lim | |
| 8,323,365 B2 | 12/2012 | Drnevich et al. | |
| 8,337,757 B2 | 12/2012 | Roychoudhury et al. | |
| 8,354,083 B2 | 1/2013 | Amsden et al. | |
| 8,486,162 B2 | 7/2013 | Kim et al. | |
| 8,557,451 B2 | 10/2013 | Edlund et al. | |
| 2002/0141917 A1 * | 10/2002 | Komaki | B01J 8/0438 422/625 |

(56) References Cited

U.S. PATENT DOCUMENTS

| | | | |
|---|---|---|---|
| 2003/0054215 A1 | 3/2003 | Doshi et al. | |
| 2003/0064259 A1 | 4/2003 | Gittleman | |
| 2003/0188486 A1 | 10/2003 | Tanaka et al. | |
| 2003/0203263 A1* | 10/2003 | Brown | H01M 8/0612 429/434 |
| 2003/0211021 A1 | 11/2003 | Oi et al. | |
| 2003/0211373 A1 | 11/2003 | Ueda et al. | |
| 2003/0218991 A1 | 11/2003 | Besecker et al. | |
| 2003/0234455 A1 | 12/2003 | Mieney et al. | |
| 2003/0235726 A1 | 12/2003 | Kelly et al. | |
| 2004/0009104 A1 | 1/2004 | Kaupert et al. | |
| 2004/0076562 A1 | 4/2004 | Manzanec et al. | |
| 2004/0144030 A1 | 7/2004 | Smaling | |
| 2004/0180247 A1 | 9/2004 | Higashiyama et al. | |
| 2004/0191591 A1 | 9/2004 | Yamamoto | |
| 2005/0008907 A1 | 1/2005 | Isozaki et al. | |
| 2005/0028445 A1 | 2/2005 | Roychoudhury et al. | |
| 2005/0069485 A1 | 3/2005 | Jung et al. | |
| 2005/0081444 A1* | 4/2005 | Anumakonda | B01J 8/067 48/214 A |
| 2005/0164046 A1 | 7/2005 | Fujihara et al. | |
| 2005/0188615 A1 | 9/2005 | Sennoun et al. | |
| 2005/0191533 A1 | 9/2005 | Kim et al. | |
| 2005/0267606 A1 | 12/2005 | Barlett, Jr. et al. | |
| 2006/0029539 A1* | 2/2006 | Dutta | B01J 8/009 423/651 |
| 2006/0051634 A1 | 3/2006 | DeVries | |
| 2006/0067861 A1 | 3/2006 | Tonkovich et al. | |
| 2006/0112553 A1* | 6/2006 | Badding | H01M 8/2435 29/890 |
| 2006/0133976 A1 | 6/2006 | Male et al. | |
| 2006/0179717 A1 | 8/2006 | LaBarge | |
| 2006/0246333 A1 | 11/2006 | Schaevitz et al. | |
| 2007/0084118 A1 | 4/2007 | Kaeding et al. | |
| 2007/0104641 A1 | 5/2007 | Ahmed et al. | |
| 2007/0172402 A1* | 7/2007 | Palo | B01J 19/0093 422/198 |
| 2007/0183949 A1 | 8/2007 | Fischer | |
| 2007/0289215 A1 | 12/2007 | Hemmings et al. | |
| 2007/0292342 A1* | 12/2007 | Hemmings | C01B 3/382 423/651 |
| 2008/0138273 A1 | 6/2008 | Jiang | |
| 2008/0148715 A1* | 6/2008 | Osumi | B01D 53/9409 60/295 |
| 2008/0152970 A1 | 6/2008 | Rush et al. | |
| 2008/0169449 A1* | 7/2008 | Mundschau | B01D 69/141 252/373 |
| 2008/0187797 A1 | 8/2008 | Edlund | |
| 2008/0295469 A1* | 12/2008 | Mizuno | B01D 46/2429 55/479 |
| 2009/0029205 A1 | 1/2009 | Venkataramani et al. | |
| 2009/0104482 A1 | 4/2009 | Miyazaki | |
| 2009/0118121 A1* | 5/2009 | Sarai | B01D 46/0024 502/439 |
| 2009/0208784 A1 | 8/2009 | Perry et al. | |
| 2009/0291335 A1 | 11/2009 | Anzai | |
| 2009/0326279 A1* | 12/2009 | Tonkovich | B01F 5/0475 568/487 |
| 2010/0015479 A1 | 1/2010 | Rusch et al. | |
| 2010/0062292 A1 | 3/2010 | Lin et al. | |
| 2010/0119894 A1 | 5/2010 | Ishida | |
| 2010/0203404 A1 | 8/2010 | Miyazaki | |
| 2010/0330446 A1 | 12/2010 | Lucka et al. | |
| 2011/0039175 A1 | 2/2011 | Yokoyama et al. | |
| 2011/0165483 A1 | 7/2011 | Yamamoto et al. | |
| 2011/0189578 A1 | 8/2011 | Crumm et al. | |
| 2011/0269032 A1 | 11/2011 | Fischer et al. | |
| 2012/0062166 A1 | 3/2012 | Thornton et al. | |
| 2012/0088167 A1 | 4/2012 | Reiners et al. | |
| 2012/0164547 A1 | 6/2012 | Weingaerthner et al. | |
| 2012/0328969 A1 | 12/2012 | Dewald et al. | |
| 2013/0028815 A1 | 1/2013 | Basini et al. | |
| 2013/0032762 A1* | 2/2013 | Quintero | B01J 19/2475 252/373 |
| 2013/0056911 A1 | 3/2013 | Finnerty et al. | |
| 2013/0059223 A1 | 3/2013 | Finnerty et al. | |
| 2013/0230787 A1 | 9/2013 | Finnerty et al. | |
| 2013/0323162 A1* | 12/2013 | De Groot | B01J 8/009 423/651 |
| 2014/0107233 A1* | 4/2014 | Banister | B01J 12/007 518/703 |
| 2014/0335463 A1 | 11/2014 | Friedrich et al. | |
| 2014/0346402 A1* | 11/2014 | Tetzlaff | B01J 8/1872 252/373 |

FOREIGN PATENT DOCUMENTS

| | | |
|---|---|---|
| GB | 1314984 A | 4/1973 |
| WO | 9841394 A1 | 9/1998 |
| WO | 02099917 A2 | 12/2002 |
| WO | 2004/091771 A1 | 10/2004 |
| WO | 2006032644 A1 | 3/2006 |
| WO | 2006034868 A1 | 4/2006 |
| WO | 2008031024 A1 | 3/2008 |
| WO | 2009116977 A2 | 9/2009 |
| WO | 2011019825 A2 | 2/2011 |

OTHER PUBLICATIONS

C. Finnerty, K. Kendall, G. A. Tompsett, Integrated Catalytic Burner/Micro-SOFC Design and Applications Electrochemistry, 68 (2) (2000) 519-521.

K. Kendall, C. Finnerty, G.A. Tompsett, P. Windibank, and N. Coe, "Rapid Heating SOFC System for Hybrid Applications." Electrochemistry, vol. 68, No. 6, (2000) 403.

Finnerty C., Cunningham R.H., Ormerod R.M, "Development of a novel test system for in situ catalytic, electrocatalytic and electrochemical studies of internal fuel reforming in solid oxide fuel cells." Catalysis letters, vol. 66, No. 4, (2000) 221-226(6).

C. Finnerty, N.J. Coe, R.H. Cunningham and R.M. Ormerod, "Steam Reforming and Partial Oxidation of Methane over nickel/zirconia and doped nickel/zirconia anodes in working solid oxide fuel cells." Catalysis Today, in press (1998).

C. Finnerty, R.H. Cunningham and R.M. Ormerod, "Development of more tolerant nickel/zirconia anodes for solid oxide fuel cells running on natural gas." Proc. 3rd Eur. Conf. on SOFCs, 1998, 217-226.

C. Finnerty, R.H. Cunningham and R.M. Ormerod, "Combined Electrochemical and Catalytic studies of anodes in working solid oxide fuel cells" Proc. 3rd Eur. Conf. on SOFCs, 1998, 227-236.

C. Finnerty, R.H. Cunningham and R.M. Ormerod, "Study of the Catalysis and Surface Chemistry occurring at nickel/zirconia anodes in soiid oxide fuel cells running on natural gas." Radiation Effects and Defects in Soiids [ISSN 1042-0150]. vol. 151 pp. 77-82.

C. Finnerty, R.H. Cunningham, K. Kendall and R.M. Ormerod, "A novel test system for in situ catalytic and electrochemical measurements on fuel processing anodes in working solid oxide fuel cells." J. Chem. Soc. Chem. Comm., (1998) 915.

R.H. Cunningham, C. Finnerty, K. Kendall and R.M. Ormerod, "An in situ catalytic and electrochemical study of working nickel/zirconia anodes in tubular Solid Oxide Fuel Cells." Proc. 5th Int. Symp. on SOFCs, The Electrochem. Soc., 1997, 965-972.

R.H. Cunningham, C. Finnerty and R.M. Ormerod, "Study of Surface Carbon formed on working anodes of Solid Oxide Fuel Cells running on methane" Proc. 5th Int. Symp. on SOFCs, The Electrochem. Soc., 1997, 973-983.

Finnerty C, Cunningham RH, Ormerod RM, "Development of a novel solid oxide fuel cell system based on a tubular zirconia reactor." Radiation Effects and Defects in Solids [ISSN 1042-0150] vol. 151 pp. 71-76.

Finnerty, Caine, and David Coimbra, "Solid oxide fuel cells with novel internal geometry." U.S. Pat. No. 6,998,187. Feb. 14, 2006.

Finnerty C, Alston T, Ormerod RM, Kendall K, "A Solid Oxide Fuel Cell Demonstration Kit, Operated on Butane/Propane Portable Fuel Cells" Jun. 1999. ISBN 3-905592-3-7, Edited by F N Buchi, European Fuel Cell Forum.

(56) References Cited

OTHER PUBLICATIONS

Finnerty C, Cunningham RH, Ormerod RM, "In situ catalytic, electrocatalytic and electrochemical studies of fuel processing anodes in solid oxide fuel cells running on natural gas." Proceedings of 12th International Conference on Solid-state Ionics, Halkidiki, Greece Jun. 1999. International Society for Solid-state Ionics.
Finnerty C, Cunningham RH, Ormerod RM, "Internal reforming over Nickel/Zirconia Anodes in SOFCs: Influence of anode formulation, pre-treatment and operating conditions." Solid Oxide Fuel Cells VI Oct. 1999. 1999, Edited by S.C Singhal and M. Dokiya, Published by The Electrochemical Society, ISBN 1-56677-242-7.
Finnerty C, Ormerod RM, "Internal reforming and electrochemical performance studies of Doped Nickel/Zirconia anodes in SOFCs running on methane." Solid Oxide Fuel Cells VI, Oct. 1999. 1999, Edited by S.C Singhal and M. Dokiya, Published by the Electrochemical Society, ISBN 1-56677-242-7.
Caine Finnerty, Geoff. A. Tompsett, Kevin Kendall and R. Mark Ormerod, "SOFC system with integrated catalytic fuel processing." Journal of Power Sources, vol. 86, Issues 1-2, Mar. 2000, pp. 459-463.
Caine Finnerty. Neil J. Coe, Robert H. Cunningham and R. Mark Ormerod. "Carbon formation on and deactivation of nickel-based/ zirconia anodes in solid oxide fuel cells running on methane." Catalysis Today, vol. 46, Issues 2-3, Nov. 16, 1998, pp. 137-145.
K Kendall, C, Finnerty, G. Saunders and J.T. Chung, "Effects of dilution on methane entering an SOFC anode" Journal of Power Sources, vol. 106, Issues 1-2, Apr. 1, 2002, pp. 323-327.
G.A. Tompsett C. Finnerty, K. Kendall, T. Alston and N.M. Sammes, "Novel applications for micro-SOFCs." Journal of Power Sources, vol. 86, Issues 1-2, Mar. 2000, pp. 376-382.
Caine Finnerty and R. Mark Ormerod, "Internal reforming over nickel/zirconia anodes in SOFCS operating on methane: influence of anode formulation, pre-treatment and operating conditions." Journal of Power Sources, vol. 86, Issues 1-2, Mar. 2000, pp. 390-394.
C Finnerty, T. Alston, K. Kendall and R.M. Ormerod, "Development of a small portable SOFC system with integrated catalytic fuel processing." Sixth Grove Fuel Cell Symposium, Sep. 1999, 125.
C. Finnerty, K. Kendall, J.C. Austin, T. Alston ,"Ceramic fuel cells to replace metal burners." Journal of Material science, 36, (2001) 1119-1124.
Ormerod RM, Finnerty CM, Cunningham RH, "In situ catalytic and electrocatalytic studies of internal fuel reforming in solid oxide fuel cells running on natural gas." Studies in Surface Science and Catalysis, Elsevier, [ISBN 0-444-50480-X]. 7 pp. 425-431.
P.K. Cheekatamarla, C.M. Finnerty et al., "Highly Efficient Next-Generation Tubular Solid Oxide Fuel Cells Powered by Readily Available Hydrocarbon Fuels", To be submitted to Nature, 2008.
P.K. Cheekatamarla, C.M, Finnerty, "Synthesis gas generation via partial oxidation reforming of liquid fuels." Accepted for publication, International Journal of Hydrogen Energy, 2008.
Y. Du, C. Finnerty, and J. Jiang, "Thermal Stability of Portable Microtubular SOFCs and Stacks." In press, Journal of the Electrochemical Society, 155(9), 1-XXXX, (2008).
Y. Du, C. Finnerty, and J. Jiang, "Thermal Stability of Portable Micro-Tubular Solid Oxide Fuel Cell and Stack" ECS Trans. 12, (1) 363 (2008).
P.K. Cheekatamarla, C.M. Finnerty , Jun Cai, "Internal reforming of hydrocarbon fuels in tubular solid oxide fuel cells," International Journal of Hydrogen Energy, vol. 33, Issue 7, Apr. 2008, pp. 1853-1858.
Praveen K. Cheekatamarla, C.M. Finnerty, "Reforming catalysts for hydrogen generation in fuel cell applications." Journal of Power Sources, vol. 160, Issue 1, Sep. 29, 2006, pp. 490-499.
P.K. Cheekatamarla, C.M. Finnerty, "Hydrogen Generation via partial oxidation reforming of liquid fuels." Prepr. Pap.-Am. hem, Soc., Div. Fuel Chem. 2007, 52 (2), 288.
P.K. Cheekatamarla, C.M. Finnerty , Jun Cai, "Internal reforming of hydrocarbon fuels in tubular solid oxide fuel cells." ECS Trans. 12, (1) 439 (2008).
P.K. Cheekatamarla, C.M. Finnerty, A. Stanley, C. Robinson, P. Dewald, Y. Lu, Y. Du, "Performance Characteristics of an Integrated Portable JP8 SOFC—Reformer System."ECS Transactions vol. 5, Mar. 2007.
C.M. Finnerty, Y. Du, P.K. Cheekatamarla, B.J. Emley, W. Zhu, J. Cai, R. Sharp, "Geometric Effects on Tubular Solid Oxide Fuel Cells." ECS Transactions—Solid Oxide Fuel Cells, vol. 7, Jun. 2007.
C. Finnerty, C. Robinson, S. Andrews, Y. Du, P. Cheekatamarla, P. Dewald, Y. Lu, T. Schwartz, "Portable Propane Micro-Tubular SOFC System Development." ECS Transactions—Solid Oxide Fuel Cells, vol. 7, Jun. 2007.
D. Bhattacharya, R. Rengaswamy and C. Finnerty, "Isothermal Models for Tubular Anode Supported Solid Oxide Fuel Cell", Chemical Engineering Science, 62(16), pp. 4250-4267, 2007.
D. Bhattacharya, R. Rengaswamy and C. Finnerty, "Dynamic Simulation and Analysis of a Solid Oxide Fuel Cell", in the proceedings of ESCAPE-17, Bucharest, 2007.
Debangsu Bhattacharya, Raghunathan Rengaswamy and Caine Finnerty, "Validation of a Phenomenological Steady-State Model for Solid Oxide Fuel Cell (SOFC)", presented at the Annual AIChE meeting, San Francisco, 2006.
Debangsu Bhattacharya, Raghunathan Rengaswamy and Caine Finnerty, "A Twodimensional Dynamic Model for Tubular Solid Oxide Fuel Cell", presented at the Annual AlChE meeting, San Francisco, 2006.
Debangsu Bhattacharya, Raghunathan Rengaswamy and Caine Finnerty, "Optimization Studies on Anode-Supported Tubular Solid Oxide Fuel Cells", presented at the Annual AlChE Meeting, Salt Lake City, 2007.
Debangsu Bhattacharya, Raghunathan Rengaswamy and Caine Finnerty, "Dynamics and Volterra-Model Based Control of a Tubular Solid Oxide Fuel Cell", presented at the Annual AlChE Meeting, Salt Lake City, 2007.
Debangsu Bhattacharya, Raghunathan Rengaswamy and Caine Finnerty, "Identification and Control of a Tubular Solid Oxide Fuel Cell ( SOFC)", presented at the Annual AlChE meeting, Philadelphia, 2008.
Praveen K. Cheekatamarla, Caine M. Finnerty, Yanhai Du, Juan Jiang, Jian Dong, P.G. Dewald, C.R. Robinson, Advanced tubular solid oxide fuel cells with high efficiency for internal reforming of hydrocarbon fuels Original Research Article; Journal of Power Sources, vol. 188, Issue 2, Mar. 15, 2009, pp. 521-526.
Praveen K. Cheekatamarla, Caine M. Finnerty, Charles R. Robinson, Stanley M. Andrews, Jonathan A. Brodie, Y. Lu, Paul G. Dewald, "Design, integration and demonstration of a 50 W JP8/ kerosene fueled portable SOFC power generator", Original Research Article Journal of Power Sources, vol. 193, Issue 2, Sep. 5, 2009, pp. 797-803.
Debangsu Bhattacharyya, Raghunathan Rengaswamy, Caine Finnerty, "Dynamic modeling and validation studies of a tubular solid oxide fuel cell." Original Research Article Chemical Engineering Science, vol. 64, Issue 9, May 1, 2009, pp. 2158-2172.
Zuo, Chendong et al. "Advanced Anode-supported Micro-tubular SOFC Development" ECS Transactions 17.1 (2009): 103-110.
Finnerty, Caine, and David Coimbra, "Anode-supported solid oxide fuel cells using a cermet electrolyte." U.S. Pat. No. 7,493,095. Mar. 3, 2009.
Finnerty, Caine M. "The catalysis and electrical performance of nickel-based/zirconia fuel reforming anodes in solid oxide fuel cells running on methane." Diss. University of Keele, 1998.
Khaligh, Alireza, et al. "Digital control of an isolated active hybrid fuel cell/Li-ion battery power supply." IEEE Transactions on Vehicular technology 56.6 (2007): 3709-3721.
Lankin, Michael, Yanhai Du, and Caine Finnerty, "A review of the implications of silica in solid oxide fuel cells." Journal of Fuel Cell Science and Technology 8.5 (2011): 054001.

* cited by examiner

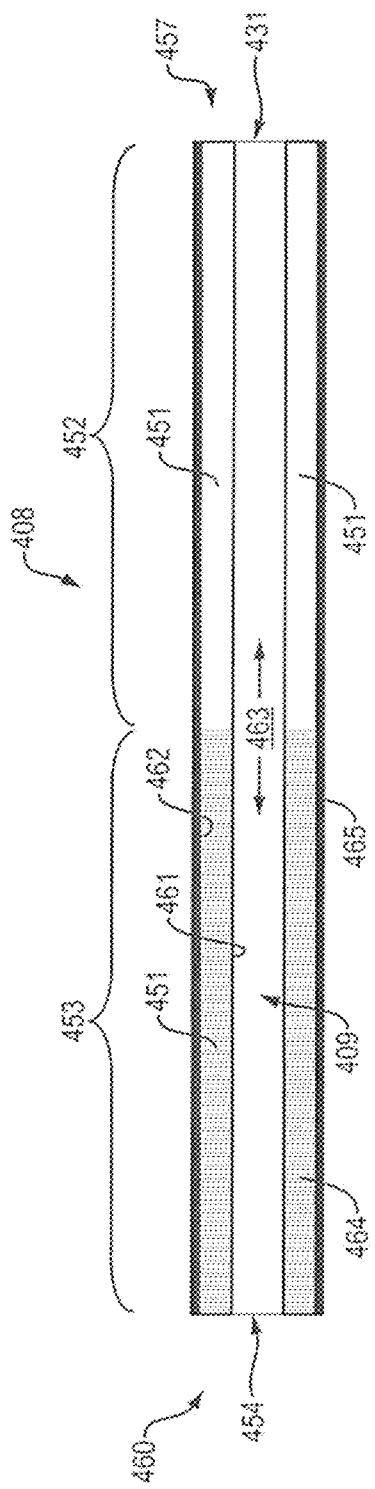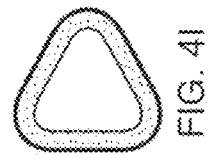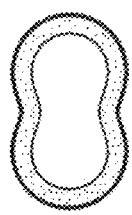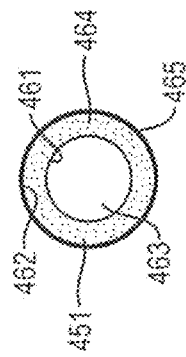
FIG. 4F
FIG. 4I
FIG. 4H
FIG. 4G

US 9,627,699 B2

GASEOUS FUEL CPOX REFORMERS AND METHODS OF CPOX REFORMING

CROSS REFERENCE TO RELATED APPLICATIONS

This application claims priority to and the benefit of the filing date of U.S. Provisional Patent Application No. 61/900,543, filed on Nov. 6, 2013, the entire disclosure of which is incorporated by reference herein.

FIELD

The present teachings relate to gaseous fuel catalytic partial oxidation reformers and methods of catalytic partial oxidation reforming of gaseous reformable fuels to produce hydrogen-rich reformates.

BACKGROUND

The conversion of a gaseous or liquid reformable fuel to a hydrogen-rich carbon monoxide-containing gas mixture, a product commonly referred to as "synthesis gas" or "syngas," can be carried out in accordance with any of such well known fuel reforming operations such as steam reforming, dry reforming, autothermal reforming, and catalytic partial oxidation (CPOX) reforming. Each of these fuel reforming operations has its distinctive chemistry and requirements and each is marked by its advantages and disadvantages relative to the others.

The development of improved fuel reformers, fuel reformer components, and reforming processes continues to be the focus of considerable research due to the potential of fuel cells, i.e., devices for the electrochemical conversion of electrochemically oxidizable fuels such hydrogen, mixtures of hydrogen and carbon monoxide, and the like, to electricity, to play a greatly expanded role for general applications including main power units (MPUs) and auxiliary power units (APUs). Fuel cells also can be used for specialized applications, for example, as on-board electrical generating devices for electric vehicles, backup power sources for residential-use devices, main power sources for leisure-use, outdoor and other power-consuming devices in out-of-grid locations, and lighter weight, higher power density, ambient temperature-independent replacements for portable battery packs.

Because large scale, economic production of hydrogen, infrastructure required for its distribution, and practical means for its storage (especially as a transportation fuel) widely are believed to be a long way off, much current research and development has been directed to improving both fuel reformers as sources of electrochemically oxidizable fuels, notably mixtures of hydrogen and carbon monoxide, and fuel cell assemblies, commonly referred to as fuel cell "stacks," as converters of such fuels to electricity, and the integration of fuel reformers and fuel cells into more compact, reliable and efficient devices for the production of electrical energy.

CPOX reforming, or simply CPOX, has attracted particular attention as a way of supplying hydrogen-rich reformate to fuel cell stacks, for example, those having nominal power ratings of anywhere from 100 watts to 100 kilowatts, and all power ratings in between. Among the advantages of CPOX reforming is that the reaction is exothermic in contrast to steam reforming and dry reforming which are endothermic reactions that require an external source of heat.

Furthermore, CPOX reactions are generally faster than other reforming reactions which allows for the construction of relatively small reformers capable of fast start-up and rapid response to changes in load. CPOX reformers also tend to be simpler in design than reformers that require the handling of water and steam, for example, steam reformers and autothermal reformers, which require storage units for water, heating units for the production of steam, burner or combustion units for supplying heat to drive endothermic reforming reactions, and the like, and their associated fluid routing and operation-monitoring and control devices.

However, and as previously recognized (see, e.g., U.S. Pat. Nos. 6,790,431 and 7,578,861), the typically high levels of heat produced during CPOX reactions can have undesirable consequences including damage to the reformer and/or components thereof such as the CPOX catalyst, catalyst support, and other structural components. This is a major drawback of many current CPOX reformer designs and one in need of an effective solution.

One known type of CPOX reformer includes a catalyst support component, commonly referred to as a "catalyst monolith," "monolith catalyst support," "monolith substrate," or simply a "monolith," which has a CPOX catalyst or catalyst system deposited thereon.

Monoliths can be classified on the basis of two general configurations: a first configuration characterized by a metal or ceramic body of honeycomb-like, channeled, metallic gauze or spiral-wound corrugated sheet structure presenting an essentially linear gaseous flow path therethrough, and a second configuration characterized by a metal or ceramic foam body of reticulated, or open, pore structure presenting a tortuous gaseous flow path therethrough. Representative monoliths of one or the other general type are disclosed in, for example, U.S. Pat. Nos. 5,527,631; 6,402,989; 6,458, 334; 6,692,707; 6,770,106; 6,887,456; 6,984,371; 7,090, 826; 7,118,717; 7,232,352; 7,909,826; 7,976,787; 8,323, 365; and, U.S. Patent Application Publication No. 2013/0028815.

As shown in FIG. 1A, monolith 100, which is of a common prior art type, viewed in longitudinal cross section includes a honeycomb-like ceramic body 101 made up of numerous channels 102 impregnated or wash-coated with CPOX catalyst, an inlet end 103 for admitting a gaseous CPOX reaction mixture, i.e., a mixture of a gaseous oxidizing agent, typically air, and reformable fuel, e.g., a gaseous fuel such as methane, natural gas, propane or butane or a vaporized gaseous fuel such as gasoline, kerosene, jet fuel or diesel, an outlet end 104 for the discharge of hydrogen-rich, carbon monoxide-containing reformate product (syngas) and a CPOX reaction zone 105 which is essentially coextensive with the entire monolith.

CPOX reaction zone 105 can be considered as having an inner, or central, region 106 through which a corresponding inner, or central, portion of a gaseous CPOX reaction mixture stream inherently flows within a relatively high range of velocity $V_1$ surrounded by an outer, or peripheral, region 107 through which a corresponding outer, or peripheral, portion of the gaseous CPOX reaction mixture stream inherently flows within a relatively low range of velocity $V_2$.

Monoliths typically experience fairly high CPOX reaction temperatures, for example, on the order of from 600° C. to 1,100° C. In the case of honeycomb-like monolith 100, these high temperatures, coupled with the inherent differential in flow velocities $V_1$ and $V_2$ of the CPOX reaction mixture stream flowing within inner and outer regions 106 and 107, respectively, of CPOX reaction zone 105 tend to account for the observed operational drawbacks of monolith 100 and other essentially linear flow path monoliths where CPOX reforming is concerned.

At CPOX reaction temperatures of 600° C.-1,100° C., monolith 100 radiates a good deal of heat at its inlet end 103. Even with careful monitoring and control of the CPOX reaction conditions, it can be difficult to prevent or inhibit the phenomenon of "flashing." i.e., the premature combustion of CPOX gaseous reaction mixture stream within radiant heat zone 108 as the stream approaches inlet end 103. Heat of exotherm of the CPOX reaction occurring within initial CPOX reaction zone 109 proximate to inlet end 103 radiates outwardly therefrom into radiant heat zone 108. This radiant heat can be of sufficient intensity to raise the temperature of the advancing CPOX reaction mixture stream (indicated by the arrows) to its flash point. Flashing of the CPOX reaction mixture within radiant heat zone 108 causes undesirable thermal events, raising the temperature to a point where catalyst can be vaporized or deactivated and/or reformer structure can be damaged or rendered inoperative. These thermal events can also lead to cracking of fuel within this zone and, consequently, increased coke (carbon particle) formation resulting in deterioration of CPOX catalyst performance. Where the hydrogen-rich reformate effluent is utilized as fuel for a fuel cell stack, coke and unreformed higher hydrocarbon fragments contained therein will also deposit upon the anode surfaces of the fuel cells resulting in reduced conversion of product reformate to electricity.

As further shown in FIG. 1A, the aforementioned differential in flow velocities $V_1$ and $V_2$ of the CPOX reaction mixture stream within, respectively, inner and outer regions 106 and 107 of CPOX reaction zone 105 are also primarily responsible for the differential in CPOX reaction temperature ranges $T_1$ and $T_2$ in these regions. Thus, the higher velocity $V_1$ of the CPOX reaction mixture stream within inner region 106 results in a higher rate of CPOX reaction therein and an accompanying higher reaction temperature $T_1$ and, conversely, the lower velocity $V_2$ of the CPOX reaction mixture stream within outer region 107 results in a lower rate of CPOX reaction therein and an accompanying lower reaction temperature $T_2$. The temperature profile across inner and outer regions 106 and 107 can be represented by temperature curve 110. A sharp rise in CPOX reaction temperature $T_1$, if high enough, can result in damage to, and even total destruction oft monolith 100.

As shown in FIG. 1B, prior art-type foam monolith 150 viewed in longitudinal cross section includes a ceramic foam body 151 characterized by a reticulated, or open, network of interconnected pores and pore channels 152 supporting a CPOX catalyst or catalyst system deposited thereon by conventional or otherwise known procedures, e.g., impregnation or wash coating.

One drawback of foam monoliths of all types is their higher pressure drops due to their higher resistance to flow compared with linear-flow monoliths such as honeycomb-like monolith 100 of FIG. 1A. Higher pressure drops require higher operational pressures, and therefore higher energy consumption, to meet target flows. Another inherent drawback of foam monoliths lies in the nature of the flow paths of gaseous reactants and reaction products therein (as indicated by the arrows). The characteristic randomness of these flow paths results in very uneven temperature profiles within the monolith (e.g., as indicated by temperature curve 153), increasing the risk of thermal shock due to hot spots and/or reduced CPOX conversion rates due to cold spots.

Foam monoliths of all types are also susceptible to flashing much as in the case of the linear flow path monoliths discussed above. In addition, foam monoliths are prone to other drawbacks that are characteristic of their kind. Depending on the way in which known and conventional foam monoliths are manufactured, they can possess a relatively fragile pore network, especially within their central regions, or they can possess a more robust pore structure throughout. Both types of foam monolith are subject to disadvantages.

In the case of foam monoliths possessing a relatively fragile core region, thermal shock resulting from rapid thermal cycling of the CPOX reformer (typical of CPOX reformers that supply hydrogen-rich reformate to fuel cell assemblies) can over time degrade their structures to the point where the CPOX reaction proceeds in a very inefficient manner, if at all.

In the case of foam monoliths possessing a sturdier pore structure, such structure tends to magnify the randomness of the gas flow paths therethrough. While damage to the pore structure owing to hot spots can be negligible or nonexistent, the problem of scattered and fleeting cold spots that negatively affect the productivity of the CPOX reaction remains a drawback of this type of foam monolith.

It will also be noted that even when manufactured by a well-defined, closely-controlled process, foam monoliths will differ in their pore structures, and therefore in their gaseous flow properties, from other foam monoliths produced by the same process. As a result of unavoidable differences in their microstructures, individual foam monoliths produced by the same process of manufacture tend to exhibit idiosyncratic operational characteristics that can only be determined empirically. As a practical matter, a broader range of performance and reliability parameters or specifications will be assigned to reformers incorporating foam monoliths of the same manufacture in order to make allowance for the unpredictable variations in their performance.

Accordingly, the industry desires new designs of CPOX reformers and new methods of CPOX reforming that can address certain of the disadvantages of the prior art.

SUMMARY

In light of the foregoing, the present teachings provide gaseous fuel CPOX reformers and methods of CPOX reforming of gaseous fuels that can address one or more of the deficiencies and/or disadvantages of the state-of-the-art, for example, little or no opportunity or tendency for flashing to occur, no excessively high CPOX reaction temperatures, and/or low back pressures throughout all of its gaseous stream-routing and gaseous flow components and passageways.

In one aspect, the present teachings relate to a gaseous fuel CPOX reformer including an array of spaced-apart CPOX reactor units; and an igniter in thermal communication with a CPOX catalyst of at least one CPOX reactor unit of the gaseous fuel CPOX reformer, for example, a CPOX catalyst-containing wall section of at least one CPOX reactor unit. A CPOX reactor unit typically includes an elongate tube having a wall with an internal surface and an external surface. As such, a "gaseous fuel CPOX reformer" can be considered a "gaseous fuel multi-tubular CPOX reformer." with such expressions and permutations thereof being used interchangeably herein unless otherwise understood from the context. The wall of the CPOX reactor unit encloses an open gaseous flow passageway and defines an inlet at one end for receiving fluid flow and an outlet at an opposing end for discharge of fluid flow. A CPOX reactor unit can be in thermal communication with at least the adjacent CPOX reactor unit(s) in the array. The CPOX reactor unit can have at least a section of its wall, including the internal surface, include a CPOX catalyst. The CPOX catalyst-containing wall section typically is gas-permeable to allow gaseous CPOX reaction mixture to diffuse therein and product hydrogen-rich reformate to diffuse therefrom while remaining structurally stable under CPOX reaction conditions.

The gaseous fuel CPOX reformer can include a hydrogen barrier associated with, for example, attached or adhered to, the external surface of at least the CPOX catalyst-containing wall section. The hydrogen barrier also can be associated with a majority, substantially all, or the entire external surface of the wall of a CPOX reactor unit. In addition, the hydrogen barrier can be associated with the entire exposed external surface of the wall of a CPOX reactor unit. For example, a pressurized fluid such as a pressurized gas can be a hydrogen barrier, for example, associated with at least the external surfaces of the CPOX catalyst-containing wall section.

With respect to the array of spaced-apart CPOX reactor units and their thermal communication, the CPOX reactor units are generally spaced apart at a distance close enough for the heat from a CPOX reaction in one CPOX reactor unit to initiate a CPOX reaction in one or more adjacent CPOX reactor units. However, the CPOX reactor units are generally spaced apart at a distance far enough to permit control of the temperature of the CPOX reactor units, particularly at the outlets of the CPOX reactor units. That is, the CPOX reactor units are spaced apart so that heat loss can occur from a CPOX reactor unit to prevent damage to the CPOX reactor unit and if present, to a fuel cell stack that can be in fluid and thermal communication with the outlet(s) of the CPOX reactor unit(s). With such positioning, an array of spaced-apart CPOX reactor units can provide an appropriate thermal balance among the array and can facilitate thermal uniformity throughout or across the array.

For example, the maximum distance between adjacent CPOX reactor units can be that distance beyond which a CPOX reaction fails to be initiated in an adjacent CPOX reactor unit by the heat from a CPOX reaction in a CPOX reactor unit. In other words, initiating a CPOX reaction in one (a single) CPOX reactor unit of an array can create the necessary heat to initiate a CPOX reaction in each of the CPOX reactor units of the array of CPOX reactor units. The maximum distance can be that distance beyond which, during a steady-state mode of operation, the temperature of an array of CPOX reactor units falls below a predetermined minimum array temperature, for example, about 600° C. or about 650° C.

The minimum distance between adjacent CPOX reactor units can be that distance below which the temperature at an outlet of a CPOX reactor unit is greater than a predetermined maximum temperature. The predetermined maximum temperature can be a temperature that is tolerable by an inlet of a fuel cell stack in thermal and fluid communication with an outlet of a CPOX reactor unit, for example, about 875° C. or 900° C.

The gaseous fuel CPOX reformer can include a source of gaseous reformable fuel in fluid communication with the inlets of the CPOX reactor units. The gaseous fuel CPOX reformer can include a single igniter, or can include more than one igniter, for example, two igniters, three igniters or more, where additional igniters can be positioned in thermal communication with CPOX catalyst-containing wall sections of other CPOX reactor units.

The CPOX catalyst-containing wall section can include a ceramic or can be a ceramic. The CPOX catalyst containing wall section can be a porous substrate, for example, a porous substrate including a ceramic or a porous ceramic. At least the section of the wall including a CPOX catalyst can be or can include a perovskite. For example, greater than about 20% or greater than about 50% by weight of such wall section can be a perovskite. A CPOX catalyst can be disposed within the wall and/or disposed on an internal surface of the wall. For example, a CPOX catalyst or CPOX catalyst system can be deposited on a wall and/or surface such as the internal surface of a wall, for example, by impregnation, wash coating, or an equivalent procedure. A CPOX catalyst also partially or completely can form the wall, i.e., the structure of the wall. In certain embodiments, the amount of CPOX catalyst within a catalyst-containing wall section of a CPOX reactor unit can increase along the length of the wall section, for example, in the direction from the inlet end to the outlet end of the CPOX reactor unit, and/or can decrease from the inner surface to the outer surface of the wall. Such gradients of CPOX catalysts, if present, typically are in the CPOX reaction zone of a CPOX reactor unit.

Another feature of the presenting teachings is a manifold for distributing gaseous CPOX reaction mixture to the inlets of the CPOX reactor units, i.e., the manifold (or the manifold chamber) can be in fluid communication with the inlets of the CPOX reactor units. The manifold includes a manifold housing, where the manifold housing defines a manifold chamber. The manifold can include a gaseous CPOX reaction mixture distributor disposed within, and extending for at least a majority of the length of, the manifold chamber. The gaseous CPOX reaction mixture distributor can be in fluid communication with a conduit that outputs a gaseous CPOX reaction mixture. The gaseous CPOX reaction mixture distributor can include one or more outlets located opposite the inlets of the CPOX reactor units. The manifold can include a heater and/or passive heating elements in thermal communication with the manifold chamber. The manifold can include a cavity, where the manifold housing defines the cavity. A seal can be disposed within or adjacent to the cavity. The manifold housing typically includes a plurality of cavities, wherein the number and arrangement of the cavities coincide with the number and arrangement of the inlets of the CPOX reactor units. The seal can engage the inlet of the CPOX reactor unit thereby providing a gas-tight seal between the manifold housing and the inlet.

In another aspect, the present teachings provide a method of gaseous fuel CPOX reforming. Methods of the present teachings generally include introducing a gaseous CPOX reaction mixture including, for example, comprising, consisting essentially of, or consisting of, a gaseous reformable fuel and an oxygen-containing gas into inlets of CPOX reactor units of gaseous fuel CPOX reformers of the present teachings; initiating catalytic partial oxidation of the gaseous CPOX reaction mixture to begin production of a hydrogen-rich reformate; and maintaining catalytic partial oxidation of the gaseous CPOX reaction mixture.

In various embodiments, introducing a gaseous CPOX reaction mixture includes introducing a gaseous CPOX reaction mixture including a gaseous reformable fuel into inlets of CPOX reactor units, where the CPOX reactor units form an array of spaced-apart CPOX reactor units, each CPOX reactor unit comprising an elongate tube having a wall with an internal surface and an external surface, the wall enclosing an open gaseous flow passageway and defining an inlet and an outlet of the CPOX reactor unit. The CPOX reactor unit can be in thermal communication with at least the adjacent CPOX reactor unit(s) in the array. At least a section of the wall can include a CPOX catalyst. The CPOX catalyst-containing wall section can be gas-permeable to allow gaseous CPOX reaction mixture to diffuse therein and product (hydrogen-rich) reformate to diffuse therefrom. The CPOX catalyst-containing wall section can remain structurally stable under CPOX reaction conditions. The distance between adjacent CPOX reactor units in the array can be as described herein.

Initiating catalytic partial oxidation can include initiating a single igniter to begin the CPOX reaction within a CPOX reactor unit, which in turn can initiate the CPOX reaction in the other CPOX reactor units of the gaseous fuel CPOX reformer. For example, initiating catalytic partial oxidation can include initiating a CPOX reaction in one CPOX reactor unit; transferring the heat from the CPOX reaction to an adjacent CPOX reactor unit to initiate a CPOX reaction therein; and repeating transferring the heat to initiate a CPOX reaction in each of the CPOX reactors of the array.

Initiating catalytic partial oxidation also can include initiating more than a single igniter, for example, two, three, four, five or more igniters, to begin the CPOX reaction(s) within the CPOX reactor units of the gaseous fuel CPOX reformer.

In various embodiments, maintaining catalytic partial oxidation of the gaseous CPOX reaction mixture includes transferring heat among the CPOX reactor units within the array thereby to use less external heating than otherwise would be required for the same output of hydrogen-rich reformate. The heat transfer among the array of CPOX reactor units can maintain a predetermined minimum array temperature, for example, about 600° C. or 650° C. The predetermined minimum array temperature can be substantially uniform across the array of CPOX reactor units.

In certain embodiments, methods of gaseous fuel CPOX reforming can include using the heat of exotherm of the ongoing CPOX reaction and/or heat from some other source to heat the oxygen-containing gas component and/or heat gaseous reformable fuel of the gaseous CPOX reaction mixture about to undergo CPOX reforming.

In certain embodiments, methods of gaseous fuel CPOX reforming can include distributing a gaseous CPOX reaction mixture including a gaseous reformable fuel of substantially uniform composition, at a substantially uniform rate, and/or at a substantially uniform temperature to the inlets of one or more of several CPOX reactor units.

Further, in accordance with the present teachings, methods are provided for CPOX reforming of a gaseous reformable fuel in a start-up mode and in a steady-state mode to produce a hydrogen-rich reformate, where the methods generally can include:
  a) in a start-up mode:
    (i) introducing gaseous CPOX reaction mixture comprising oxygen-containing gas and gaseous reformable fuel into the inlet of each of a plurality of spaced-apart CPOX reactor units, each reactor unit comprising an elongate tube having an inlet for gaseous CPOX reaction mixture, an outlet for hydrogen-rich reformate, a wall with internal and external surfaces, the wall enclosing an open gaseous flow passageway with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining stable under CPOX reaction conditions,
    (ii) initiating CPOX of the gaseous CPOX reaction mixture within the CPOX reaction zones of the CPOX reactor units thereby commencing the production of hydrogen-rich reformate; and,
  b) in a steady-state mode:
    (iii) introducing gaseous CPOX reaction mixture into the inlets of the CPOX reactor units,
    (iv) discontinuing CPOX initiating step (ii) prior to, during or following step (iii) while maintaining the CPOX reaction within the CPOX reaction zones of the CPOX reactor units thereby continuing the production of hydrogen-rich reformate.

In various embodiments, the methods described herein can include, for example, in step (i) recited above, adjusting the molar ratio of oxygen to carbon of the gaseous CPOX reaction mixture to correspond to that of a fuel-lean CPOX reaction mixture. In particular embodiments, the methods can include, for example, in step (iii) recited above, adjusting the molar ratio of oxygen to carbon of the gaseous CPOX reaction mixture to correspond to that of a fuel-rich CPOX reaction mixture.

In some embodiments, the methods can include flowing fluids such as a gas using a blower or a blower system, for example, a series of blower units. Each blower unit in the series can include a casing having an axial inlet and radial outlet, an impeller disposed within the casing for drawing an oxygen-containing gas at a first pressure in the inlet and expelling oxygen-containing gas at a higher pressure through the outlet, a motor for driving the impeller, and a duct containing the outlet of at least one blower unit in the series in the inlet of at least one other blower unit in the series. In certain embodiments, at least one blower unit in the series of blower units can provide from 60% to 90% of the target gas flow of the blower system. In such embodiments, at least one other blower unit in the series of blower units can provide the balance of target gas flow of the blower system.

The foregoing as well as other features and advantages of the present teachings will be more fully understood from the following figures, description, detailed exemplary embodiments, and claims.

BRIEF DESCRIPTION OF THE DRAWINGS

It should be understood that the drawings described below are for illustration purposes only. The drawings are not necessarily to scale, with emphasis generally being placed upon illustrating the principles of the present teachings. The drawings are not intended to limit the scope of the present teachings in any way. Like numerals generally refer to like parts.

FIGS. 4F and 4G are enlarged longitudinal and lateral cross section views, respectively, of one of the tubular CPOX reactor units shown in FIG. 4E.

FIGS. 4H and 4I are lateral cross section views of two other embodiments of tubular CPOX reactor units of gaseous fuel CPOX reformers of the present teachings.

DETAILED DESCRIPTION

Figures 1A, 1B:
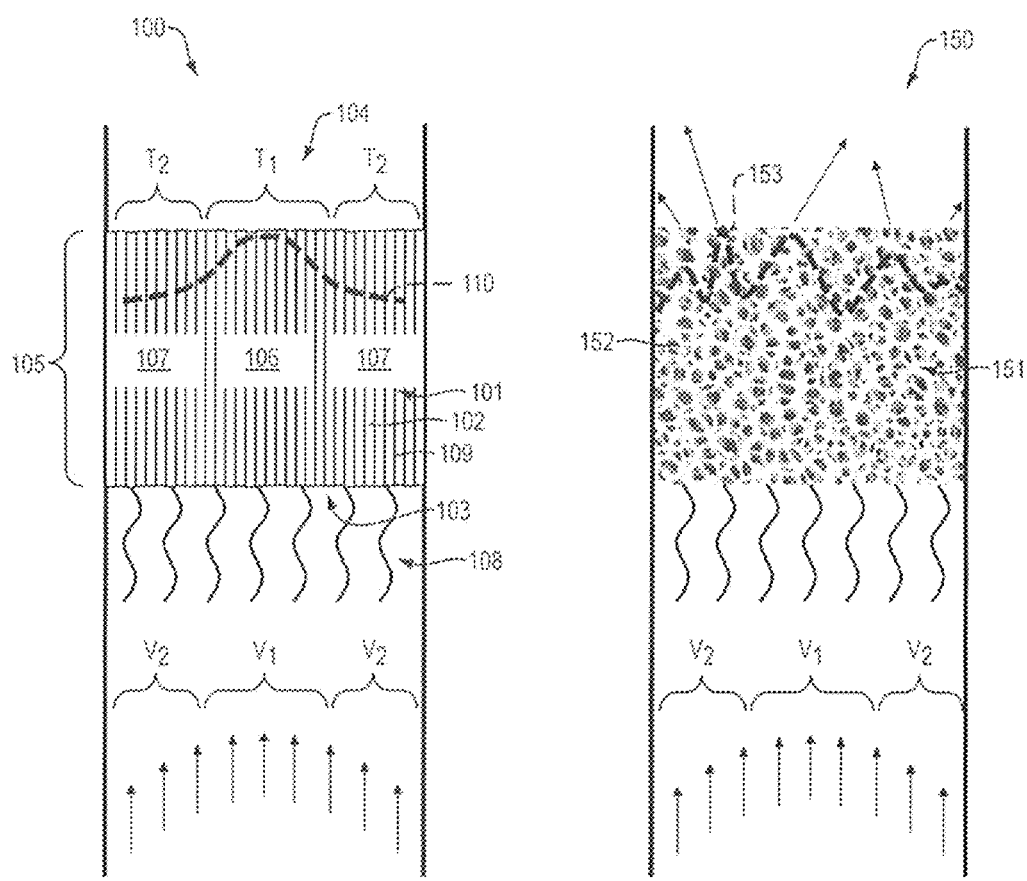
FIGS. 1A and 1B are longitudinal cross section views of two prior art types of catalyst monoliths, specifically, a honeycomb-like catalyst monolith and a foam catalyst monolith, respectively.

It now has been discovered that an array of spaced-apart CPOX reactor units can take advantage of the exothermic CPOX reaction to provide a more efficient reforming process. Unlike known and conventional CPOX reformers which employ catalyst monoliths that are susceptible to flashing, the formation of localized hot spots and cold spots, rapid coke-buildup, and/or excessively high-spiking CPOX reaction temperatures, an array of spaced-apart CPOX reactor units of the present teachings can mitigate or eliminate one or more of these drawbacks.

For example, the distribution of the total CPOX reforming or CPOX conversion load among an array of spaced-apart CPOX reactor units can simplify and facilitate the maintenance of effective thermal balance and control of the overall CPOX reforming. Such a design can permit more gaseous reformable fuel to be processed for a given CPOX catalyst loading by lowering operating temperatures for a given energy input.

The improved thermal management of the gaseous fuel CPOX reformers as described herein also can contribute to the stabilization of the temperature of the CPOX reaction taking place within each of the CPOX reactor units. Consequently, such improved thermal management can maintain suitably uniform CPOX conversion performance among the CPOX reactor units of a gaseous fuel CPOX reformer.

In addition, the design of the CPOX reformers of the present teachings can take advantage of the exothermic CPOX reaction and can permit an array of spaced-apart CPOX reactor units to be ignited with a minimum number of igniters, for example, a single igniter, whereby the initiation of the CPOX reaction in one of the CPOX reactor units can provide sufficient heat to adjacent CPOX reactor unit(s) to begin the CPOX reforming therein and eventually in each of the CPOX reactor units of the gaseous fuel CPOX reformer. Although a single igniter can be advantageous in a gaseous fuel CPOX reformer, the present teachings contemplate the use of more than a single or one igniter in the gaseous fuel CPOX reformer as the specific size of the array and CPOX reactor units, placement of the CPOX reactor units and igniters, and other factors can contribute to an overall efficient initiation or start-up process for CPOX reforming. Nevertheless, an advantage of distributing the total CPOX conversion load among a plurality of CPOX reactor units in contrast to a single CPOX reactor of comparable fuel conversion capacity is the shorter start-up time.

Moreover, the spaced-apart arrangement of the plurality of CPOX reactor units can simplify the design and manufacture of a related series or line of gaseous fuel CPOX reformers, where individual gaseous fuel CPOX reformers can differ in their fuel-reforming capacities. For example, a new, gaseous fuel CPOX reformer design that desires increased fuel-reforming capacity readily can be constructed by adding additional gaseous fuel CPOX reactor units of standardized specification to an existing design with a few, if any, other significant modifications.

It is to be understood that the present teachings herein are not limited to the particular procedures, materials, and modifications described and as such can vary. It is also to be understood that the terminology used is for purposes of describing particular embodiments only and is not intended to limit the scope of the present teachings, which will be limited only by the appended claims.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition, an apparatus, or a method described herein can be combined in a variety of ways without departing from the focus and scope of the present teachings, whether explicit or implicit herein. For example, where reference is made to a particular structure, that structure can be used in various embodiments of apparatus of the present teachings and/or in methods of the present teachings.

The use of the terms "include," "includes." "including." "have," "has," "having." "contain." "contains." or "containing," including grammatical equivalents thereof, should be generally understood as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present teachings remain operable. For example, the methods described herein can be performed in any suitable order unless otherwise indicated herein or otherwise clearly contradicted by context. Moreover, two or more steps or actions can be conducted simultaneously.

At various places in the present specification, values are disclosed in groups or in ranges. It is specifically intended that the description include each and every individual subcombination of the members of such groups and ranges and any combination of the various endpoints of such groups or ranges. For example, an integer in the range of 0 to 40 specifically is intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 specifically is intended to individually disclose 1, 2, 3, 4, 5, 6, 7, 8, 9, 10, 11, 12, 13, 14, 15, 16, 17, 18, 19, and 20.

The use of any and all examples, or exemplary language provided herein, for example, "such as," is intended merely to better illuminate the present teachings and does not pose a limitation on the scope of the invention unless claimed. No language in the specification should be construed as indicating any non-claimed element as essential to the practice of the present teachings.

Terms and expressions indicating spatial orientation or altitude such as "upper." "lower." "top." "bottom," "horizontal," "vertical," and the like, unless their contextual usage indicates otherwise, are to be understood herein as having no structural, functional or operational significance and as merely reflecting the arbitrarily chosen orientation of the various views of gaseous fuel CPOX reformers of the present teachings illustrated in certain of the accompanying figures.

The term "ceramic." in addition to its art-recognized meaning, shall be understood herein to include glasses, glass-ceramics, and cermets (i.e., ceramic-metal composites).

The expression "gas permeable." as it applies to a wall of a CPOX reactor unit herein, shall be understood to mean a wall structure that is permeable to gaseous CPOX reaction mixtures and gaseous product reformate including, without limitation, the gaseous reformable fuel component of the gaseous CPOX reaction mixture and the hydrogen component of the product reformate.

The expression "liquid reformable fuel" shall be understood to include reformable carbon- and hydrogen-containing fuels that are a liquid at standard temperature and pressure (STP) conditions, for example, methanol, ethanol, naphtha, distillate, gasoline, kerosene, jet fuel, diesel, biodiesel, and the like, that when subjected to reforming undergo conversion to hydrogen-rich reformates. The expression "liquid reformable fuel" shall be further understood to include such fuels whether they are in the liquid state or in the gaseous state, i.e., a vapor.

The expression "gaseous reformable fuel" shall be understood to include reformable carbon- and hydrogen-containing fuels that are a gas at STP conditions, for example, methane, ethane, propane, butane, isobutane, ethylene, propylene, butylene, isobutylene, dimethyl ether, their mixtures, such as natural gas and liquefied natural gas (LNG), which are mainly methane, and petroleum gas and liquefied petroleum gas (LPG), which are mainly propane or butane but include all mixtures made up primarily of propane and butane, and the like, that when subjected to reforming undergo conversion to hydrogen-rich reformates. A gaseous reformable fuel also includes ammonia, which like other gaseous reformable fuels, can be stored as a liquid.

The expression "CPOX reaction" shall be understood to include the reaction(s) that occur during catalytic partial oxidation reforming or conversion of a reformable fuel to a hydrogen-rich reformate.

The expression "gaseous CPOX reaction mixture" refers to a mixture including a gaseous reformable fuel and an oxygen-containing gas, for example, air. As used herein, a gaseous CPOX reaction mixture can comprise, consist essentially of, or consist of, a gaseous reformable fuel and an oxygen-containing gas. The CPOX reaction mixture of the present teachings does not include a liquid reformable fuel, for example, a vaporized liquid reformable fuel or a gaseous liquid reformable fuel.

The expression "open gaseous flow passageway" refers to a conduit or channel for the passage of gas therethrough where a solid, including a porous solid or material, is not present across the entire cross-sectional plane of the conduit or channel, i.e., a conduit or channel free of solids, including porous solids. For example, in the case of a CPOX reactor unit, CPOX catalyst including a porous catalyst such as a monolith cannot be present across the entire internal cross-sectional plane perpendicular to the longitudinal axis of a tubular CPOX reactor unit. Such a structure is distinct from passageways which are packed with a porous catalyst, for example, a monolith, as previously discussed. An open gaseous flow passageway also can be present in a CPOX reactor unit which can be defined as a tube which defines a hollow bore, or a cylindrical substrate defining a hollow bore therethrough along its longitudinal axis. In these exemplary descriptions, the hollow bore can be considered an open gaseous flow passageway. Although an open gaseous flow passageway usually can extend along a longitudinal axis of a CPOX reactor unit, a tortuous conduit or channel also is contemplated by the present teachings and can be capable of having an open gaseous flow passageway provided that the tortuous conduit or channel is free of solids across a cross-sectional plane of the CPOX reactor unit. It also should be understood that the cross-sectional dimension(s) of an open gaseous flow passageway can vary long its longitudinal axis or along the tortuous conduit or channel.

An important feature of a gaseous fuel CPOX reformer of the present teachings is the array of spaced-apart CPOX reactor units. An array of CPOX reactor units can refer to an orderly arrangement or a regular placement of a CPOX reactor unit in relation to the other CPOX reactor unit(s). In other words, the CPOX reactor units typically are not randomly positioned or placed. Although straight line, square, and rectangular configurations are commonly used, other configurations such as hexagonal and octagonal are contemplated by the present teachings.

The arrangement or placement of the CPOX reactor units, for example, distance and location with respect to adjacent CPOX reactor units, can be determined by various factors including, among others, the positioning and configuration of the plurality of CPOX reactor units, the materials of construction of the CPOX reactor units such as its walls and CPOX catalyst, the gaseous reformable fuel, the operating temperature of the CPOX reactor units, and the desired use and output of product hydrogen-rich reformate, for example, the materials of construction of a hydrogen reformate-consuming device such as a fuel cell unit or system to which the CPOX reformer is to be connected or coupled. If the distance between or among (adjacent) CPOX reactor units is too great, then the CPOX reactors units will not be thermally connected or have insufficient thermal communication, for example, to initiate a (CPOX reaction in an adjacent CPOX reactor unit and/or to maintain a heat transfer zone roughly encompassing the plurality of CPOX reactor units. Conversely, if the distance between or among (adjacent) CPOX reactor units is too small, the CPOX reactor units may be subjected to overheating and degradation, which can result in malfunction of the gaseous fuel CPOX reformer.

More specifically, the maximum distance between adjacent CPOX reactor units can be that distance beyond which a CPOX reaction fails to be initiated within an adjacent CPOX reactor unit by the heat generated from an initial CPOX reaction (e.g., an initial CPOX reaction initiated by an igniter) in a first-ignited CPOX reactor unit or from a CPOX reaction in an operating CPOX reactor unit. The maximum distance can be that distance beyond which, during a steady-state mode of operation, the temperature of the array of spaced-apart CPOX reactor units falls below a predetermined minimum array temperature. Depending on various factors, including those discussed herein, the predetermined minimum array temperature of an array of spaced-apart CPOX reactor units during steady-state mode of operation can be about 550° C., about 575° C., about 600° C., about 625° C., about 650° C., about 675° C., about 700° C., about 725° C., about 750° C., about 775° C., about 800° C., about 825° C., or about 850° C.

The minimum distance between adjacent CPOX reactor units can be that distance below which the temperature at an outlet of a CPOX reactor unit is greater than a predetermined maximum temperature. The predetermined maximum temperature can be a temperature that is tolerable by an inlet of a fuel cell stack in thermal and fluid communication with an outlet of a CPOX reactor unit, for example, a temperature at which the seals of the inlets of the fuel cell stack do not degrade and remain functional. Depending on various factors, including those discussed herein, the predetermined maximum temperature of a CPOX reactor unit can be about 775° C., about 800° C., about 825° C., about 850° C., about 875° C., about 900° C., about 925° C., about 950° C., about 975° C., or about 1000° C.

Another feature of CPOX reformers of the present teachings is an igniter for initiating the CPOX reaction within the CPOX reactor units, for example, an array of CPOX reactor units. In various embodiments, a single igniter can be used to initiate a CPOX reaction within each of the CPOX reactor units of a gaseous fuel CPOX reformer. In other embodiments, more than a single or one igniter, for example, two igniters, three igniters, or more than three igniters can be used to initiate or start the CPOX reaction within the CPOX reactor units. The number and placement of the igniter(s) can be determined by various parameters including, for example, the design, structure and placement of the CPOX reactor units, and the desired efficiency and rapidity of start-up of a gaseous fuel CPOX reformer.

An igniter can include a radiant heat-producing element positioned in proximity to, but in physical isolation from, an internal surface of a CPOX reactor unit, which also can be disposed within a chamber. For example, an igniter can transmit radiant heat to an exposed internal surface and/or CPOX catalyst of at least one CPOX reactor unit in proximity thereto to initiate the CPOX reaction therein. Subsequently, radiant heat produced by the CPOX reaction occurring within the CPOX reaction zone of the at least one CPOX reactor unit in turn can initiate a CPOX reaction within at least one other CPOX reactor unit, typically also within the chamber, until in such manner the CPOX reaction has been initiated in all of the CPOX reactor units of the gaseous fuel CPOX reformer.

In some embodiments, a hydrogen barrier can be associated with, such as attached to, the external surface of at least the catalyst-containing wall section of a tubular CPOX reactor unit, which catalyst-containing wall section typically defines the CPOX reaction zone. The hydrogen barrier can be attached to the entire external surface of the wall of a CPOX reactor unit. The hydrogen barrier can prevent or inhibit the loss of hydrogen from the CPOX reactor unit. In the absence of such a barrier, hydrogen may diffuse through and beyond the catalyst-containing wall section of the CPOX reactor unit rather than exit the CPOX reactor unit through its outlet.

In particular embodiments, a gaseous fuel CPOX reformer can include a source of gaseous reformable fuel. The source of gaseous reformable fuel can include a tank or other container for storage and/or delivery of a gaseous reformable fuel to the gaseous fuel CPOX reformer, for example, to the inlets of CPOX reactor units.

Accordingly, in various embodiments, a gaseous fuel CPOX reformer can include an array of spaced-apart CPOX reactor units; an igniter in thermal communication with a CPOX catalyst of at least one CPOX reactor unit; and a source of gaseous reformable fuel in fluid communication with inlets of CPOX reactor units. The CPOX reactor units can include an elongate tube, for example, a cylinder defining a hollow bore, having a gas-permeable ceramic wall with an internal surface and an external surface, where at least a section of the gas-permeable ceramic wall comprises a CPOX catalyst. The gas-permeable ceramic wall can enclose an open gaseous flow passageway and defines an inlet and an outlet of the CPOX reactor unit. When in an array, a CPOX reactor unit usually is in thermal communication with at least the adjacent (CPOX reactor unit(s) in the array.

In some embodiments, a gaseous fuel CPOX reformer can include a plurality of spaced-apart CPOX reactor units, each CPOX reactor unit comprising an elongate tube having an inlet for gaseous CPOX reaction mixture, and an outlet for hydrogen-rich reformate, a wall with internal and external surfaces, the wall enclosing an open gaseous flow passageway with at least a portion of the wall having CPOX catalyst disposed therein, comprising its structure or a combination thereof, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining stable under CPOX reaction conditions.

In some embodiments, heat recovered from the exotherm of an ongoing CPOX reaction and/or heat recovered from one or more other heat sources can be utilized to heat oxygen-containing gas and/or heat gaseous reformable fuel prior to formation of a gaseous CPOX reaction mixture.

In various embodiments, an igniter for initiating the CPOX reaction within an array of CPOX reactor units, for example, during a start-up mode of operation of a gaseous fuel CPOX reformer, is in thermal communication with a CPOX catalyst, for example, in a CPOX reaction zone. The igniter can initiate a CPOX reaction in at least one CPOX reactor unit proximate thereto with heat of exotherm within the at least one CPOX reactor unit in turn initiating the CPOX reaction within one or more other CPOX reactor units within the array.

In some embodiments, a manifold or plenum, in fluid communication with the inlets of CPOX reactor units, can be configured to provide a more uniform distribution of gaseous CPOX reaction mixture, for example, at a substantially uniform composition, at a substantially uniform temperature and/or at a substantially uniform rate, to inlets of CPOX reactor units.

In certain embodiments, a manifold can have a housing or enclosure defining a manifold chamber. A manifold or manifold chamber can include a gas distributor, for example, a gas distributor within the manifold chamber. In particular embodiments, the gas distributor can be considered a gaseous fuel CPOX reaction mixture distributor. The housing or enclosure can be fabricated from a relatively low cost, readily moldable thermoplastic or thermosetting resin and/or can feature "cold seal" connections between its outlets and the inlets of the CPOX reactor units.

More specifically, a manifold can be in fluid communication with the inlet of at least one CPOX reactor unit, where the manifold includes a manifold housing. The manifold housing can define a manifold chamber. The manifold can include one or more additional components such as a gaseous CPOX reaction mixture distributor, a heater, and a cavity including a seal.

The gaseous CPOX reaction mixture distributor can be disposed within, and extending for at least a majority of the length of the manifold chamber, where is in fluid communication with a gaseous reactants conduit, and the gaseous CPOX reaction mixture distributor includes one or more outlets located opposite the inlet of the CPOX reactor unit. That is, a gaseous CPOX reaction mixture distributor can include a housing defining a chamber, for example, a closed-ended hollow tube or other structure, typically having a length greater than its width and depth. The housing can define a one or more outlets providing fluid communication between the interior of the housing or chamber and the exterior of the housing. The one or more outlets can be along one side of the gaseous CPOX reaction mixture distributor or form a line or longitudinal array along its longitudinal axis, for example, in the case of a tubular gaseous CPOX reaction mixture distributor. When positioned in the manifold chamber, the one or more outlets of the gaseous CPOX reaction mixture distributor usually are located opposite the inlets of the CPOX reactor units. In such a design, the CPOX reaction mixture is initially introduced into the manifold chamber in a direction away from the inlets of the CPOX reactors units, for example, downward towards the bottom of the manifold chamber and then will flow towards the inlets of the CPOX reactor units, for example, flowing upwards to the inlets.

A heater can be in thermal communication with the manifold chamber. The heater can be an electrical resistance heater. The heater can be disposed within the manifold chamber. In addition, the heater can include a passive heating element such as at least one thermally conductive element in thermal communication with the manifold and a CPOX reaction zone of CPOX reactor unit thereby to transfer heat of exotherm from the CPOX reaction zone and/or CPOX reactor unit to the manifold.

The manifold housing can define one or more cavities. A seal can be disposed within or adjacent to the cavity, where the seal can engage the inlet of the CPOX reactor unit and can provide a gas-tight seal between the manifold housing and the inlet. Where more than one CPOX reactor unit is present, the manifold housing can include the same number of cavities as CPOX reactor units such that each CPOX reactor unit can be in fluid communication with the manifold chamber and each cavity can include a seal securing a respective CPOX reactor unit. The cavities of the manifold housing can be sized and arranged in the same configuration as the inlets of the CPOX reactor units to provide a match for each cavity to an inlet. The seal can be a gasket. The manifold housing can be fabricated from or include a material that remains thermally and mechanically stable at the temperature of operation of the CPOX reactor units.

In particular embodiments, the walls of the CPOX reactor units can include at least two regions, a first, or upstream, region being substantially devoid of CPOX catalyst and enclosing an essentially CPOX reaction-free zone of relatively low operating temperature and a second, or downstream, region containing CPOX catalyst and enclosing a CPOX reaction zone of relatively high operating temperature.

In various embodiments, a blower system featuring an interconnected series of individual centrifugal blower units can be used to introduce a flow of oxygen-containing gas into the reformer and/or can provide for gas flow within the CPOX reformer, for example, for heat transfer, which can include heating and/or cooling of structure(s) and thermal zone(s).

In some embodiments, a control system can be adapted to control the operations of the CPOX reformer in its start-up, steady-state, and/or shut-down modes.

A gaseous fuel CPOX reformer of the present teachings can include a conduit for routing gas toward the inlets of the CPOX reactor units. The conduit can include an inlet for oxygen-containing gas, an inlet for gaseous reformable fuel, a mixing zone in which oxygen-containing gas and gaseous reformable fuel combine to provide a gaseous CPOX reaction mixture, and/or an outlet for gaseous CPOX reaction mixture. The conduit can be generally U-shaped.

A gaseous fuel CPOX reformer of the present teachings can include a mixer, for example, to mix oxygen-containing gas and gaseous reformable fuel. The mixer can be a static mixer or a dynamic mixer, for example, a fluid mixing device such as described in co-pending, co-owned U.S. patent application Ser. No. 14/335,463, entitled, "Mixing Reformable Fuels and an Oxygen-Containing Gas and/or Steam," which is incorporated by reference herein for all purposes including its teachings relating to a fluid mixing device and methods of operating the same to provide a CPOX reaction mixture applicable to the present teachings.

A gaseous fuel CPOX reformer of the present teachings can include a CPOX reformate processing unit or device, for example, a carbon monoxide removal device to reduce the carbon monoxide content of the product reformate. A CPOX reformate processing unit or device can include a water gas shift converter, a preferential oxidation reactor, and/or a hydrogen-selective membrane for separating reformate into a hydrogen stream and a carbon monoxide-containing stream.

In various embodiments, a gaseous fuel CPOX reformer of the present teachings can have one or more outlets of CPOX reactor units directly connected to inlet(s) of another device, for example, a fuel cell. In some embodiments, outlets of CPOX reactor units can be in fluid communication with a manifold or similar component or device that can combine the effluent stream from multiple CPOX reactor unit outlets and distribute such combined effluent to an equal, a greater, or a lesser number of inlets of another device, for example, an anode of a fuel cell.

A gaseous fuel CPOX reformer of the present teachings can include thermal insulation for reducing heat loss from the tubular CPOX reactor units and other heat radiating components of the reformer.

A gaseous fuel CPOX reformer of the present teachings can include a gaseous stream driver for driving gaseous flow within and through the CPOX reformer. The gaseous stream driver can be a blower or blower system. A gaseous fuel CPOX reformer of the present teachings can include a fuel pump. Examples of a pump such as a fuel pump include a metering pump, a rotary pump, an impeller pump, a diaphragm pump, a peristaltic pump, a positive displacement pump, a gear pump, a piezoelectric pump, an electrokinetic pump, an electroosmotic pump and a capillary pump.

A gaseous fuel CPOX reformer of the present teachings can include one or more sensor assemblies for monitoring and controlling one or more reformer operations. Examples of sensor assemblies include flow meters, thermocouples, thermistors, and resistance temperature detectors. A gaseous fuel CPOX reformer of the present teachings also can include a control system for automating the operations of the reformer in its start-up, steady-state, and/or shut-down modes. The control system can include a plurality of sensor assemblies in communication with a controller.

A gaseous fuel CPOX reformer of the present teachings can include heat transfer means in thermal communication with the CPOX reactor units. The heat transfer means can transfer heat from the CPOX reactor units during a steady-state mode of operation of the gaseous fuel (CPOX reformer, for example, to maintain the temperature within the CPOX reaction zone of the CPOX reactor units within a preset range. Heat transfer means can include a blower, for example, to direct a coolant stream against exposed exterior surfaces of the CPOX reactor units and/or against a heat-radiative member of a heat conducting assembly in thermal communication with exposed surfaces of CPOX reactor units. A gaseous fuel CPOX reformer of the present teachings also can include a blower for other purposes. For example, a blower can introduce oxygen-containing gas into a conduit and/or drive gaseous flow within a CPOX reactor unit.

A blower can include a series of blower units. A blower or blower unit in a series can include a casing having an axial inlet and a radial outlet, an impeller disposed within the casing for drawing in a gas, for example, an oxygen-containing gas such as air, in the axial inlet and expelling the gas through the radial outlet; and a motor for driving the impeller. In certain embodiments, the blower can draw in a gas at a first pressure and expel the gas at a second, for example, higher, pressure. A blower also can include a duct to contain the outlet of at least one blower unit in the series with the inlet of at least one other blower unit in the series. For example, a series of blowers can include the blower systems as described in co-owned U.S. Patent Application Publication No. 2012/0328969, entitled, "Centrifugal Blower System and Fuel Cell Incorporating Same." which is incorporated by reference herein for all purposes including its teachings relating to a blower system and methods of operating the same as applicable to the present teachings.

A gaseous fuel CPOX reformer of the present teachings can include a source of electrical current for powering electrical energy-consuming reformer components and/or auxiliary CPOX reformer components. The source of electrical current can include a rechargeable battery and battery recharger.

In another aspect, methods of CPOX reforming are provided. More specifically, the present teachings provide methods of CPOX reforming of a gaseous reformable fuel to a hydrogen-rich reformate or product. To that end, in various embodiments, the methods of CPOX reforming can include:
a) in a start-up mode:
(i) introducing oxygen-containing gas into a conduit for routing gas toward the inlet of each of a plurality of CPOX reactor units, the conduit comprising an inlet for oxygen-containing as, an inlet for gaseous reformable fuel and an outlet for gaseous CPOX reaction mixture in gaseous flow communication with the inlets of the CPOX reactor units, each CPOX reactor unit comprising an elongate tube having an inlet for gaseous CPOX reaction mixture, an outlet for hydrogen-rich reformate, a wall with internal and external surfaces, the wall enclosing an open gaseous flow passageway with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining structurally stable under CPOX reaction conditions.
(ii) introducing gaseous reformable fuel into the conduit, the gaseous reformable fuel combining with oxygen-containing gas from step (i) to provide gaseous CPOX reaction mixture,
(iii) introducing gaseous CPOX reaction mixture from step (ii) into the inlets of the CPOX reactor units, and
(iv) initiating CPOX of the gaseous CPOX reaction mixture within the CPOX reaction zones of the CPOX reactor units thereby commencing the production of hydrogen-rich reformate; and,
b) in a steady-state mode:
(v) introducing oxygen-containing gas into the conduit.
(vi) introducing gaseous reformable fuel into the conduit, the gaseous reformable fuel combining with oxygen-containing gas from step (v) to provide gaseous CPOX reaction mixture.
(vii) introducing gaseous CPOX reaction mixture from step (vi) into the inlets of the CPOX reactor units, and
(viii) discontinuing CPOX initiating step (iv) prior to, during or following step (vii) while maintaining the CPOX reaction within the CPOX reaction zones of the CPOX reactor units thereby continuing the production of hydrogen-rich reformate.

In some embodiments, the methods can include heating oxygen-containing gas at ambient temperature or at an ambient temperature prior to its introduction into a conduit using heat from an external heat-producing source. In various embodiments, the methods can include heating further the oxygen-containing gas from a first temperature to a second elevated temperature, for example, using heat of exotherm recovered from the CPOX reaction occurring within the CPOX reaction zones of the CPOX reactor units.

In some embodiments, the methods can include making the gaseous CPOX mixture more uniform in composition, for example, substantially uniform in composition, prior to its introduction into the inlets of the CPOX reactor units. In various embodiments, the methods can include distributing the gaseous CPOX reaction mixture of substantially uniform composition to the inlets of the CPOX reactor units and/or distributing the gaseous CPOX reaction mixture to the inlets of the CPOX reactor units at a substantially uniform temperature. In some embodiments, the methods include distributing the gaseous CPOX reaction mixture to the inlets of the CPOX reactor units such that the difference in flow rate of the CPOX reaction mixture within any two CPOX reactor units is not greater than about 20% and/or the difference in the temperature of CPOX reaction mixture entering the inlets of any two CPOX reactor units in not greater than about 10%.

In certain embodiments of the present teachings, the methods can include initiating CPOX of the gaseous CPOX reaction mixture within the CPOX reaction zones of the CPOX reactor units by operating an igniter, where radiant heat output from the igniter can be transmitted to an exposed section of at least one CPOX reactor unit in proximity thereto to initiate the CPOX reaction therein, radiant heat produced by the CPOX reaction occurring within the CPOX reaction zone of the at least one CPOX reactor unit in turn initiating the CPOX reaction within at least one other CPOX reactor unit within the chamber until in such manner the CPOX reaction has been initiated in all of the CPOX reactor units in the chamber.

In various embodiments, the methods can include adjusting the molar ratio of oxygen to carbon of the gaseous CPOX reaction mixture to correspond to that of a fuel-lean CPOX reaction mixture, for example, in step (iii) recited above. In certain embodiments, the methods can include adjusting the molar ratio of oxygen to carbon of the gaseous CPOX reaction mixture to correspond to that of a fuel-rich CPOX reaction mixture, for example, in step (vii) recited above.

In some embodiments, the methods of the present teachings include providing gas flow by a blower system including a series of blower units, each blower unit in the series comprising a casing having an axial inlet and radial outlet, an impeller disposed within the casing for drawing an oxygen-containing gas at a first pressure in the inlet and expelling oxygen-containing gas at a higher pressure through the outlet and a motor for driving the impeller, and a duct containing the outlet of at least one blower unit in the series in the inlet of at least one other blower unit in the series, at least one blower unit in the series providing from 60 to 90% of the target gas flow of the blower system and the at least one other blower unit in the series providing the balance of the target gas flow of the blower system. In various embodiments, the methods can include a back pressure in the CPOX reformer of not more than about three (3) inches of water.

Gaseous fuel CPOX reformers and methods of CPOX reforming according to the present teachings generally are described above and elsewhere herein. The following description with reference to the figures embellishes upon certain of these features and others of gaseous fuel CPOX reformers and CPOX reforming processes of the present teachings and should be understood to discuss various and specific embodiments without limiting the essence of the invention and that can be applicable to the discussion above.

Figure 2:
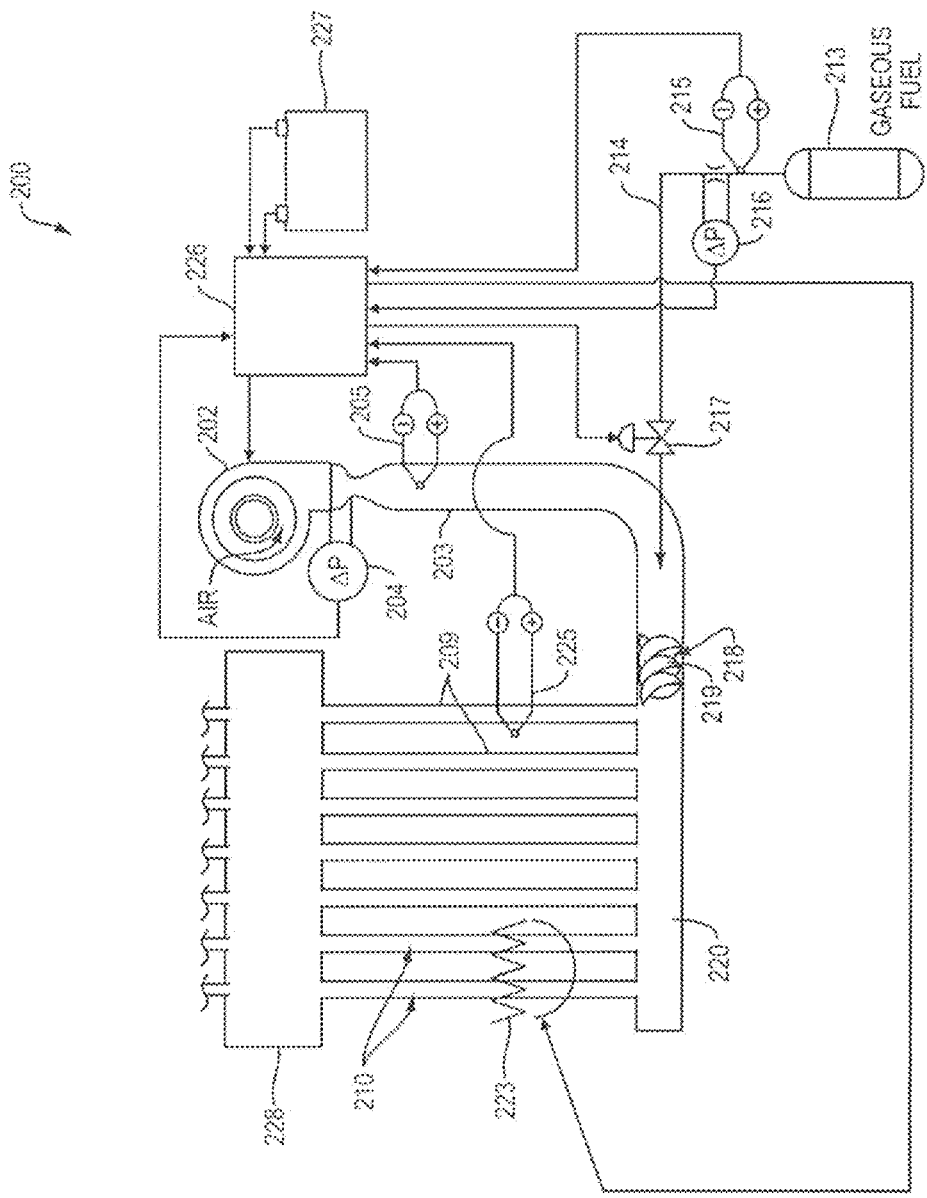
FIG. 2 is a schematic block diagram of an embodiment of a gaseous fuel CPOX reformer in accordance with the present teachings.

Referring now to the drawings. FIG. 2 illustrates one embodiment of a gaseous fuel CPOX reformer in accordance with the present teachings. As shown in FIG. 2, gaseous fuel CPOX reformer 200 includes centrifugal blower 202 for introducing oxygen-containing gas, exemplified here and in the other embodiments of the present teachings by air, into conduit 203, and for driving this and other gaseous streams (inclusive of gaseous fuel-air mixture (s) and hydrogen-rich reformates) through the various passageways, including open gaseous flow passageways, of the CPOX reformer. Conduit 203 can include flow meter 204 and thermocouple 205. These and similar devices can be placed at various locations within a gaseous fuel CPOX reformer in order to measure, monitor and control the operation of the gaseous fuel CPOX reformer as more fully explained in connection with the control system illustrated in FIG. 3A.

In a start-up mode of operation of exemplary gaseous fuel CPOX reformer 200, air introduced by blower 202 into conduit 203 combines with gaseous reformable fuel, exemplified here and in the other embodiments of the present teachings by propane, introduced into conduit 203 at a relatively low pressure from gaseous fuel storage tank 213 through fuel line 214 equipped with optional thermocouple 215, flow meter 216, and flow control valve 217. The air and propane combine in mixing zone 218 of conduit 203. A mixer, for example, a static mixer such as in-line mixer 219, and/or vortex-creating helical grooves formed within the internal surface of conduit 203, or an externally powered mixer (not shown), are disposed within mixing zone 218 of conduit 203 to provide a more uniform propane-air gaseous CPOX reaction mixture than would otherwise be the case.

Figure 4A:
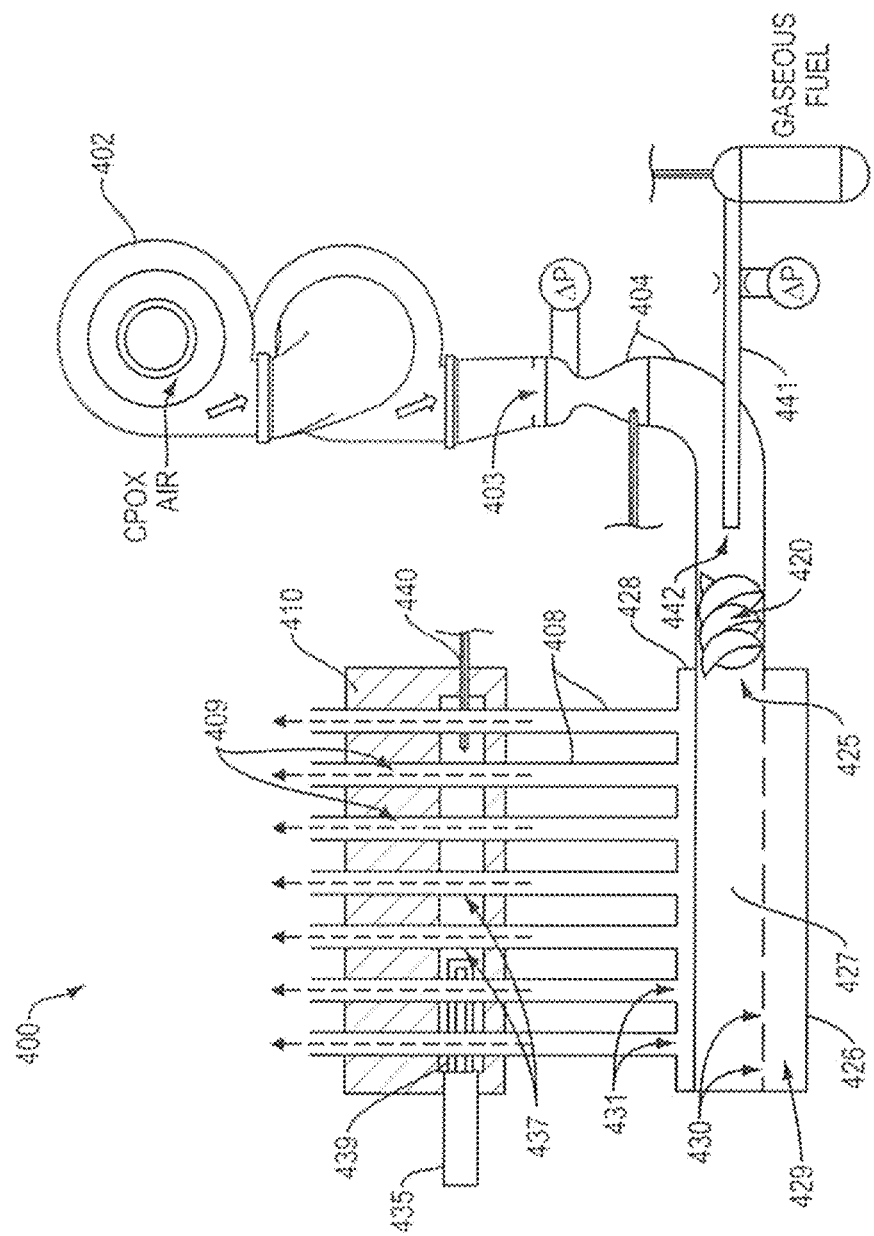
FIG. 4A is a longitudinal cross section view of an embodiment of a gaseous fuel CPOX reformer in accordance with the present teachings.
Figure 4B:
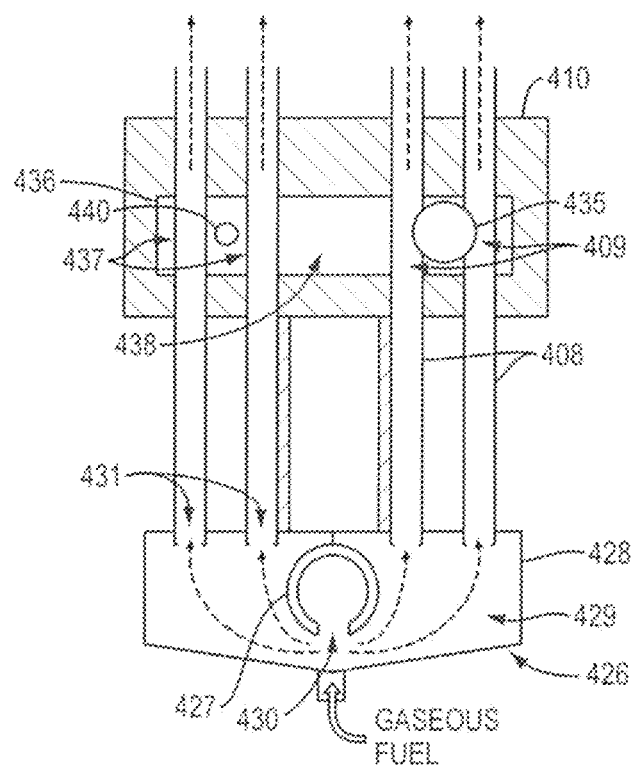
FIG. 4B is a lateral (perpendicular to the longitudinal axis) cross section view of the gaseous fuel CPOX reformer illustrated in FIG. 4A.
Figure 4C:
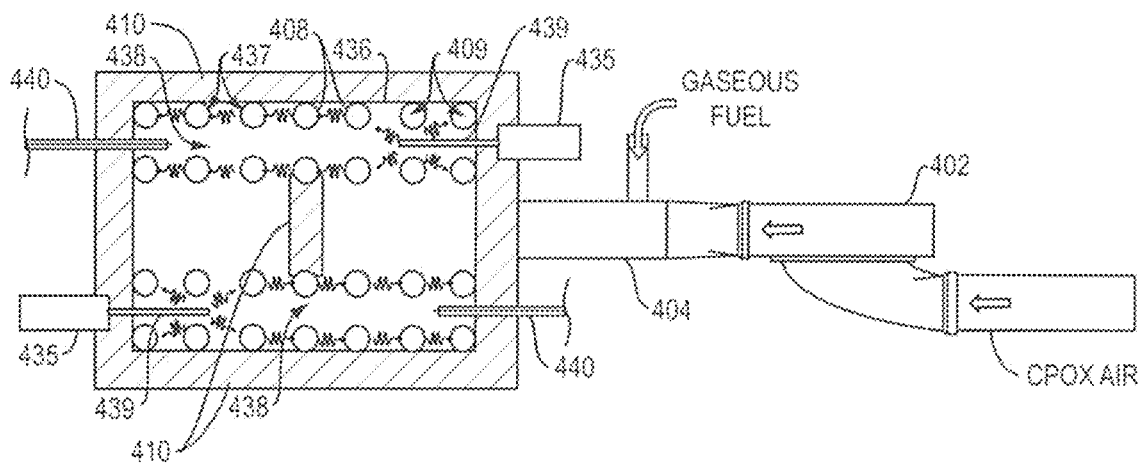
FIG. 4C is a plan cross section view of a portion of the gaseous fuel CPOX reformer illustrated in FIG. 4A.
Figure 4D:
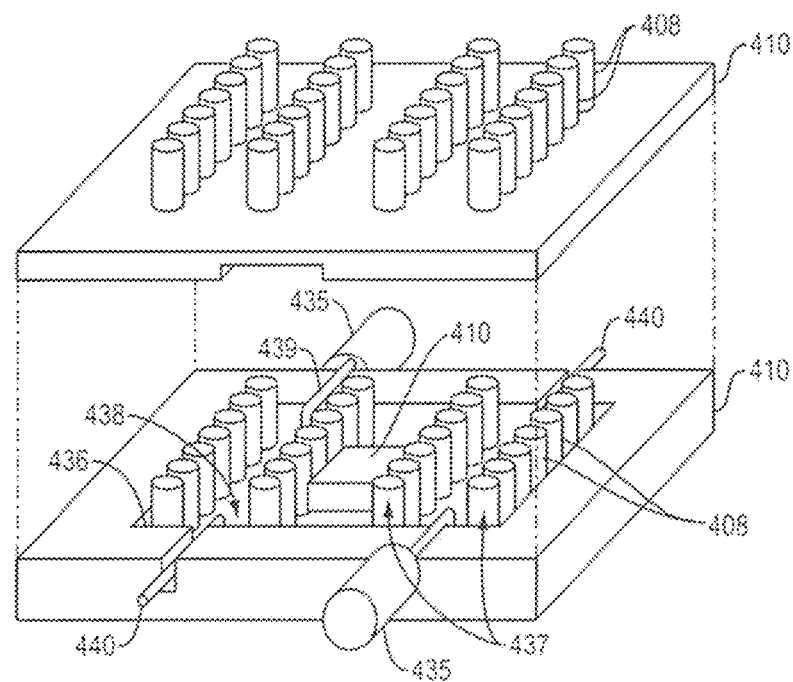
FIG. 4D is an enlarged perspective view of the igniter component of the gaseous fuel CPOX reformer illustrated in FIGS. 4A-4C.
Figure 4E:
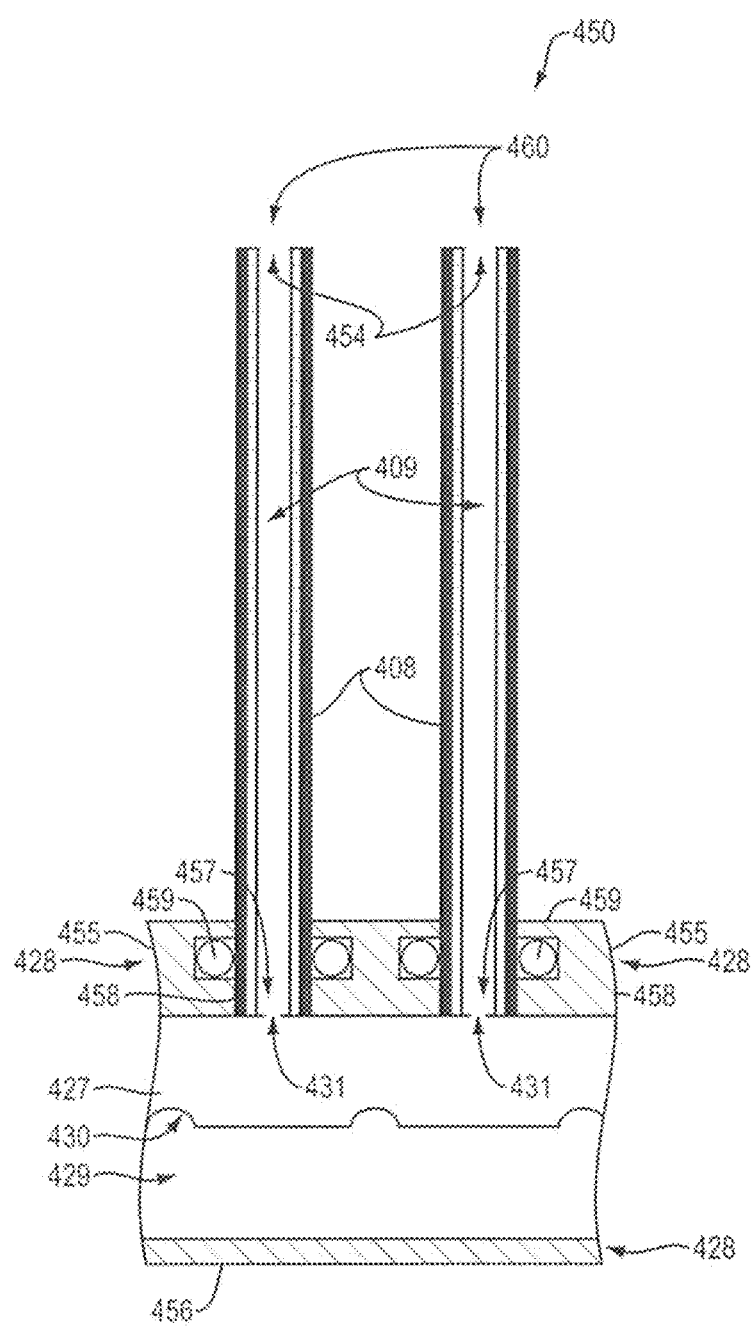
FIG. 4E is an enlarged longitudinal cross section view of a portion of the manifold and associated tubular CPOX reactor units of the gaseous fuel CPOX reformer illustrated in FIGS. 4A-4C.

The propane-air mixture (i.e., gaseous CPOX reaction mixture) enters manifold, or plenum, 220 which functions to distribute the reaction mixture more evenly into tubular CPOX reactor units 209, a detailed description of one embodiment of which is presented herein in connection with tubular CPOX reactor units 408 of manifold portion 450 illustrated in FIG. 4E. In a start-up mode of operation of CPOX reformer 200, igniter 223 initiates the gaseous phase CPOX reaction of the gaseous CPOX reaction mixture within CPOX reaction zones 210 of tubular CPOX reactor units 209 thereby commencing the production of hydrogen-rich reformate. Once steady-state CPOX reaction temperatures have been achieved (e.g., 250° C. to 1,100° C.), the reaction becomes self-sustaining and operation of the igniter can be discontinued. Thermocouple 225 is positioned proximate to one or more CPOX reaction zones 210 to monitor the temperature of the CPOX reaction occurring within CPOX reactor units 209, the temperature measurement being relayed as a monitored parameter to reformer control system 226.

Reformer 200 can also include a source of electrical current, for example, rechargeable lithium-ion battery system 227, to provide power for its electrically driven components such as blower 202, flow meters 204 and 216, flow control valve 217, and igniter 223.

If desired, product effluent, for example, hydrogen-rich reformate, from a gaseous fuel CPOX reformer can be introduced into one or more conventional or otherwise known carbon monoxide removal devices for the reduction of its carbon monoxide (CO) content, for example, where the product effluent is to be introduced as fuel to a fuel cell stack utilizing a catalyst that is particularly susceptible to poisoning by CO, for example, a polymer electrolyte membrane fuel cell. As shown in FIG. 2. carbon monoxide removal device 228 can be in direct fluid communication with the outlets of CPOX reactor units 209. Thus, for example, the product effluent can be introduced into a water gas shift (WGS) converter wherein CO is converted to carbon dioxide ($CO_2$) while at the same time producing additional hydrogen, or the product effluent can be introduced into a reactor wherein CO is made to undergo preferential oxidation (PROX) to $CO_2$. CO reduction can also be carried out employing a combination of these processes, for example, WGS followed by PROX and vice versa.

It is also within the scope of the present teachings to reduce the level of CO in the product reformate by passage of the product reformate through a known or conventional clean-up unit or device equipped with a hydrogen-selective membrane providing separation of the product reformate into a hydrogen stream and a CO-containing by-product stream. Units/devices of this kind can also be combined with one or more other CO-reduction units such as the aforementioned WGS converter and/or PROX reactor.

Figure 3A:
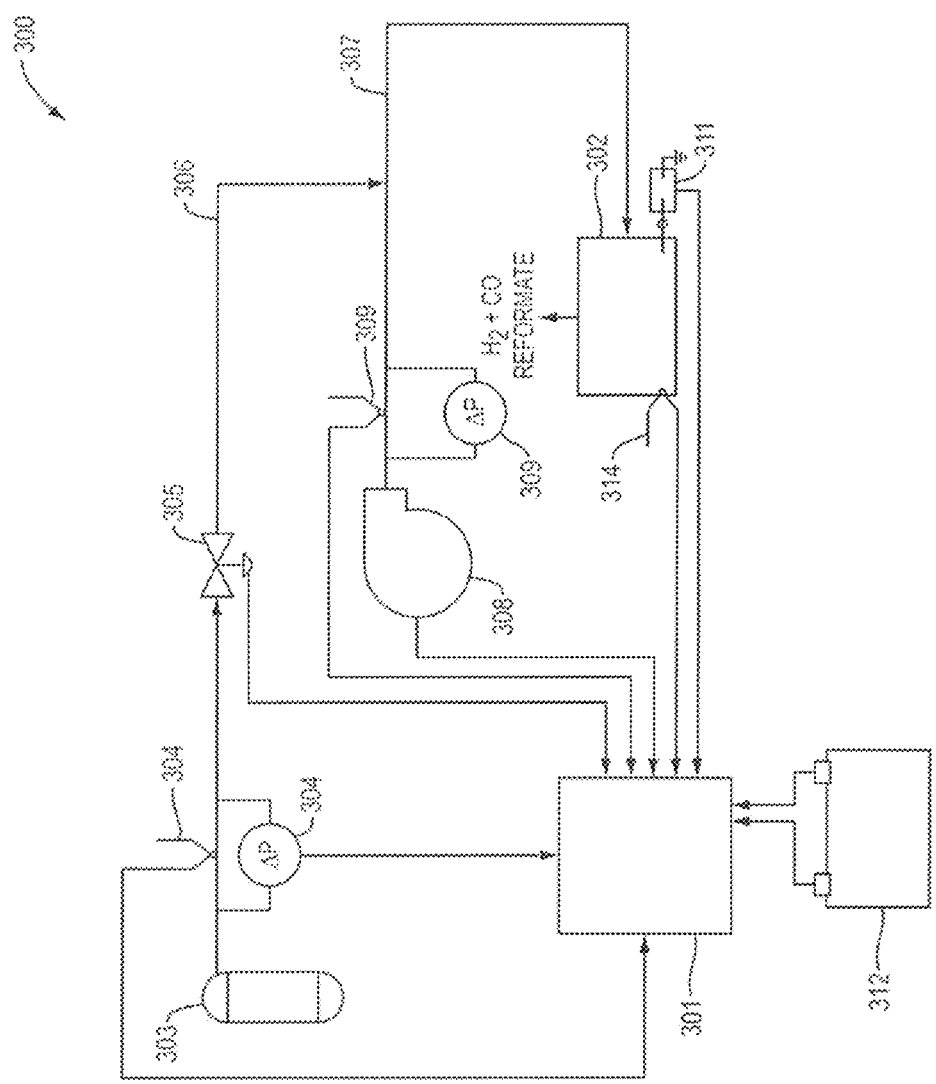
FIG. 3A is a schematic block diagram of an exemplary control system for managing the operations of the gaseous fuel CPOX reformer of FIG. 2.

Control system 300 illustrated in FIG. 3A is provided for controlling the operations of a gaseous fuel CPOX reformer in accordance with the present teachings. As shown in FIG. 3A, control system 300 includes controller 301 to manage gaseous fuel CPOX reformer 302 in its start-up, steady-state, and shut-down modes of operation. The controller can be software operating on a processor. However, it is within the scope of the present teachings to employ a controller that is implemented with one or more digital or analog circuits, or combinations thereof.

Control system 300 further includes a plurality of sensor assemblies, for example, thermocouple and associated fuel pressure meter 304, thermocouple and associated air pressure meter 309, and reformer thermocouple 314, in communication with controller 301 and adapted to monitor selected operating parameters of CPOX reformer 302.

In response to input signals from the sensor assemblies, user commands from a user-input device and/or programmed subroutines and command sequences, a controller can manage the operations of a gaseous fuel CPOX reformer. More specifically, a controller can communicate with a control signal-receiving portion of the desired section or component of a gaseous fuel CPOX reformer by sending command signals thereto directing a particular action. Thus, for example, in response to flow rate input signals from thermocouple and associated pressure meters 304 and 309 and/or temperature input signals from reformer thermocouple 314, controller 301 can send control signals to fuel flow control valve 305, for example, to control the flow of fuel from gaseous fuel storage tank 303 through fuel line 306 to conduit 307, to centrifugal blower 308 to control the flow of air into conduit 307 and drive the flow of gaseous CPOX reaction mixture within and through CPOX reformer 302, to igniter 311 to control its on-off states, and to battery/battery recharger system 312 to manage its functions.

The sensor assemblies, control signal-receiving devices and communication pathways herein can be of any suitable construction and of those known in the art. The sensor assemblies can include any suitable sensor devices for the operating parameters being monitored. For example, fuel flow rates can be monitored with any suitable flow meter, pressures can be monitored with any suitable pressure-sensing or pressure-regulating device, and the like. The sensor assemblies can also, but do not necessarily, include a transducer in communication with the controller. The communication pathways will ordinarily be wired electrical signals but any other suitable form of communication pathway can also be employed.

In FIG. 3A, communication pathways are schematically illustrated as single- or double-headed arrows. An arrow terminating at controller 301 schematically represents an input signal such as the value of a measured flow rate or measured temperature. An arrow extending from controller 301 schematically represents a control signal sent to direct a responsive action from the component at which the arrow terminates. Dual-headed pathways schematically represent that controller 301 not only sends command signals to corresponding components of CPOX reformer 302 to provide a determined responsive action, but also receives operating inputs from CPOX reformer 302 and mechanical units such as fuel control valve 305 and blower 308 and measurement inputs from sensor assemblies such as pressure meters 304 and 309 and thermocouple 314.

Figure 3B:
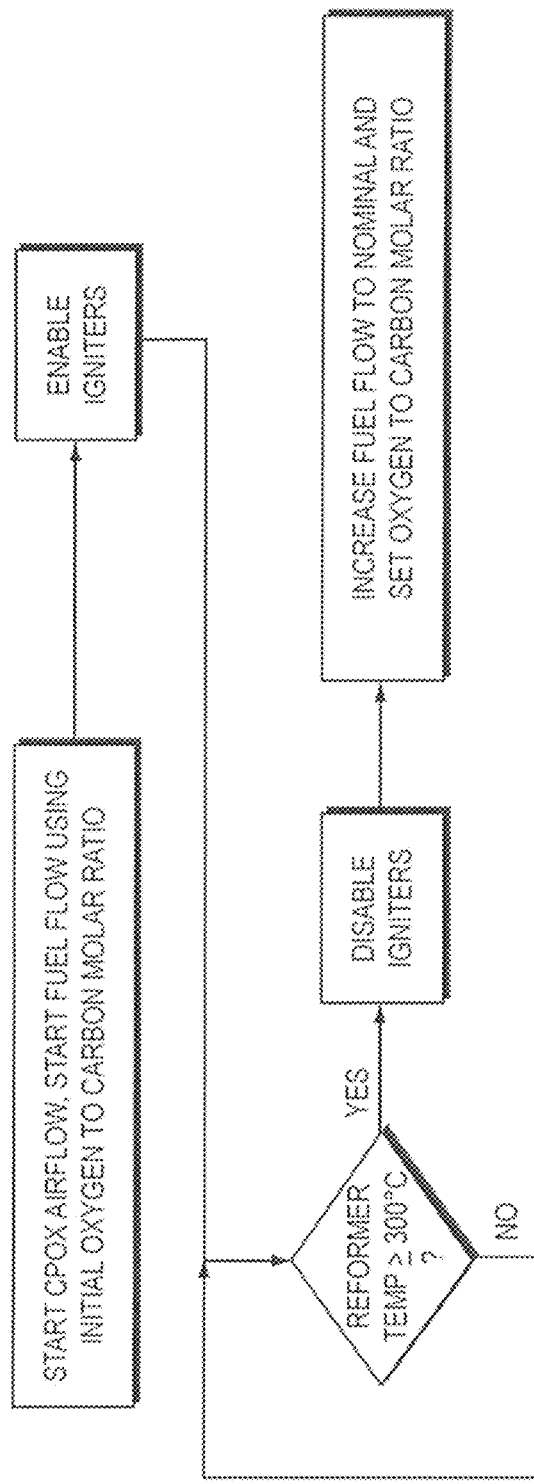
FIG. 3B is a flowchart of an exemplary control routine executed by a controller such as the control system illustrated in FIG. 3A.

FIG. 3B presents a flow chart of an exemplary control routine that can be executed by a controller of a control system to automate the operations of a gaseous fuel CPOX reformer. The flow chart can be executed by a controller at a fixed interval, for example, every 10 milliseconds or so. The control logic illustrated in FIG. 3B performs several functions including the management of gaseous flows and CPOX reaction temperatures in start-up and steady-state modes of operation and management of the procedure for the shut-down mode of reformer operation.

Figure 4J:
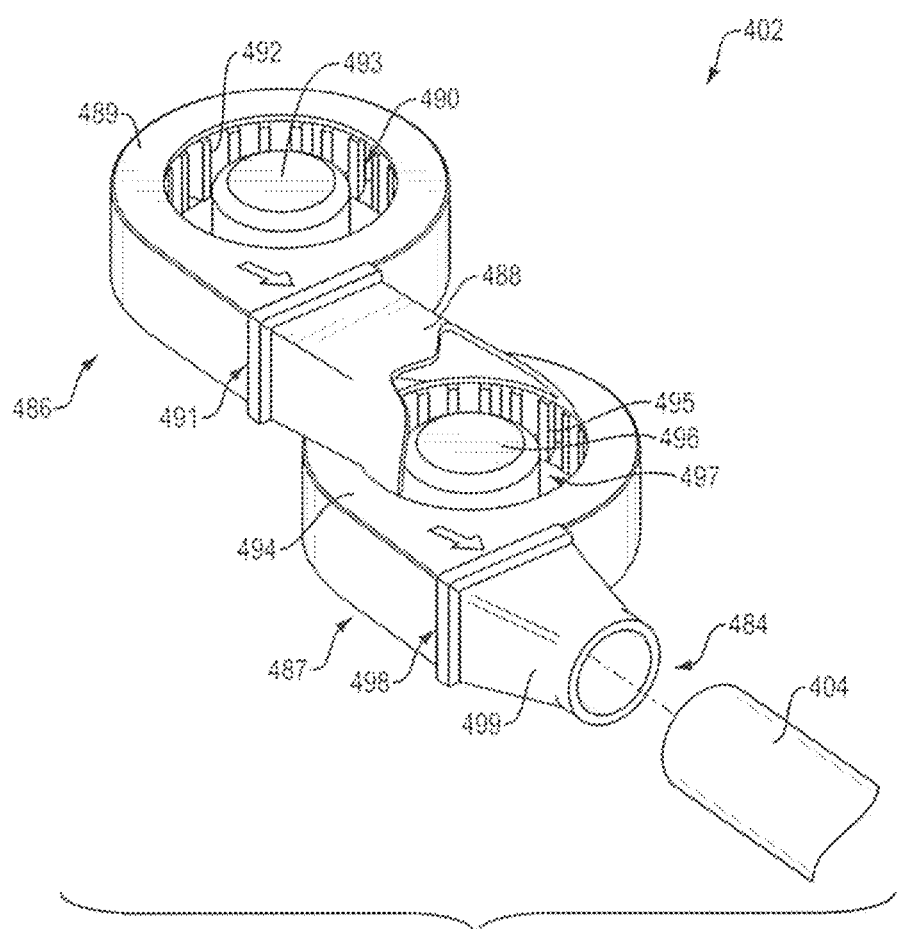
FIGS. 4J and 4K illustrate, respectively, perspective and plan views of the blower system components of the gaseous fuel CPOX reformers illustrated in FIGS. 4A-4C.
Figure 4K:
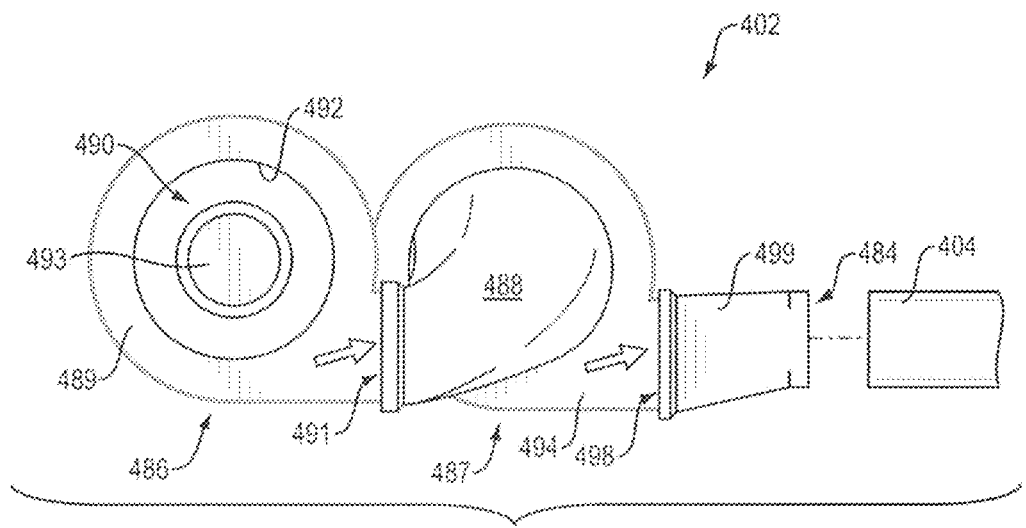

As shown in the various views of exemplary gaseous fuel CPOX reformer 400 and components thereof illustrated in FIGS. 4A-4K, which are representative of further embodiments of the present teachings, air as an oxygen-containing gas, typically at ambient temperature, is introduced at a preset mass flow rate via centrifugal blower system 402, shown in greater detail in FIGS. 4J and 4K, through inlet 403 of conduit 404. Propane is introduced into conduit 404 via fuel line 441 and fuel inlet 442. Propane and air begin to combine in mixing zone 420 of conduit 404 to provide a gaseous CPOX reaction mixture. A mixer of any suitable kind, for example, a static mixer disposed within mixing zone 420 and/or a helically-grooved internal wall surface of conduit 404, can be included to provide a gaseous CPOX reaction mixture of greater compositional uniformity than otherwise would form in mixing zone 420.

Following its passage through the optional static mixer and/or contact with helical grooves disposed within mixing zone 420, gaseous CPOX reaction mixture exits conduit 404 through outlet 425 and enters gas distributor 427 of manifold 426, which is configured to provide a more uniform distribution of the reaction mixture to, and within, tubular CPOX reactor units 408. Such an arrangement or other arrangement within the present teachings can provide a distribution of gaseous CPOX reaction mixture where the difference in flow rate of the gaseous CPOX reaction mixture within any two CPOX reactor units is not greater than about 20 percent, for example, not greater than about 10 percent, or not greater than about 5 percent.

Returning to FIG. 4A, manifold 426 (an enlarged longitudinal cross section view of a portion of which is illustrated in FIG. 4E together with associated tubular CPOX reactor units 408) includes manifold housing, or enclosure, 428 defining manifold chamber 429 within which gaseous CPOX reaction mixture (gas) distributor 427 is connected to outlet 425 of conduit 404. Gaseous CPOX reaction mixture exiting conduit 404 through outlet 425 enters gas distributor 427 thereafter passing outwardly through apertures (e.g., holes or slots) 430 located at the bottom or lower part of the gas distributor, the gas then flowing around the exterior surface of the distributor to its top or upper part and from there into inlets 431 of tubular CPOX reactor units 408. The path of the gaseous CPOX reaction mixture as it passes through orifices 430 and into inlets 431 is shown in FIG. 4B.

Some specific factors that can bear upon the optimization of the design of a manifold for accomplishing its function of promoting a more uniform distribution of gaseous CPOX reaction mixture to CPOX reactor units include the configuration of its housing, the volume of its chamber, and the dimensions of the gas distributor including the number, design and placement of its orifices. Such factors in turn depend on such reformer design and operational factors as the target flow rates of gaseous CPOX reaction mixture within a conduit, the number and arrangement of CPOX reactor units, the shape and dimensions of inlets of CPOX reactor units, and similar considerations. A manifold of optimal fuel-air distribution performance for a particular gaseous fuel CPOX reformer in accordance with the present teachings can be readily constructed by those skilled in the art employing routine testing methods.

Where a CPOX reaction zone of a CPOX reactor unit is substantially coextensive with the length of the reactor unit, a manifold housing can be fabricated from a material that remains thermally and mechanically stable at the high temperatures that are typical of CPOX reforming. In these embodiments, various kinds of refractory materials, including refractory composites such as carbon fiber- and/or glass fiber-reinforced ceramics, are suitable for fabricating the manifold housing. Suitable materials of construction include dense ceramics such as various known types of alumina, recrystallized alumina, alumino-silicates, boron nitride, glass-ceramics, magnesium oxide, zirconium phosphate, and the like, metals such as nickel-chromium-based super alloys, Hastelloy super alloys, and the like. However, these and other refractory materials tend to be relatively high in cost and can also be challenging to work with, especially in the case of manufacturing articles with relatively complex configurations.

As shown in an enlarged, exemplary longitudinal cross section view of CPOX reactor unit 408 illustrated in FIG. 4F, gas-permeable wall 451 of CPOX reactor units 408 can be divided along its length into a first, or upstream, region 452, starting at its fuel-air mixture inlet 431, that is substantially devoid of CPOX catalyst, and a second, or downstream, region 453, starting at the end of first region 452 and ending at or proximate to product reformate effluent outlet 454 of the reactor unit, that contains a catalytically effective amount of CPOX catalyst 464. During steady-state operation of CPOX reformer 400 of FIG. 4A, this embodiment of CPOX reactor unit largely confines hot CPOX reaction zones 409 to their second regions 453 leaving its essentially CPOX catalyst-free first region 452 to remain at a considerably lower temperature, for example, in the region of from ambient to up about 350° C., particularly at the juncture of fuel-air mixture inlets 431 of CPOX reactor units 408 and manifold housing 428.

The lower temperature of a CPOX catalyst-free wall section zone, which temperature is lower than the melting temperature of many thermoplastic resins and below the thermal degradation temperature of many thermoset resins, makes it practical and advantageous to utilize any of several families of thermoplastic and thermoset resins for the manufacture of a manifold housing. Specific types of thermoplastic and thermoset resins that can be used for the fabrication of a manifold housing include polyetherimide (PEI), polyaryletherketones (PAEKs) such as polyether ether ketone (PEEK), phenol-formaldehyde resins, and the like. These and other thermally stable resins, in addition to their relatively low material cost, have the added advantage of being readily formable into complex shapes employing low cost manufacturing procedures such as extrusion molding, vacuum molding, injection molding, reaction injection molding, rotational molding, and the like, and are therefore well suited for making manifold housings having relatively complex geometries.

Returning to FIG. 4A, from manifold 426, gaseous CPOX reaction mixture enters inlets 431 of CPOX reactor units 408 and into CPOX reaction zones 409 where the reaction mixture undergoes a gaseous phase CPOX reaction to produce a hydrogen-rich, carbon monoxide-containing reformate. In the start-up mode, one or more igniter(s) 435 initiates CPOX. After CPOX becomes self-sustaining, for example, when the temperature of the reaction zone reaches from about 250° C. to about 1100° C., the igniter(s) can be shut off as external ignition no longer is required to maintain the now self-sustaining CPOX reaction. Thermal insulation 410, for example, of the microporous or alumina-based refractory type, surrounds those portions of the CPOX reformer to reduce thermal losses from these components.

FIGS. 4A-4D illustrate an embodiment of the present teachings where two igniters 435 (one for each array) are used to initiate a CPOX reaction within CPOX reaction zones 409 of CPOX reactor units 408 in a chamber during the start-up mode of operation of reformer 400. As shown in FIGS. 4C and 4D. CPOX reactor units 408 are arranged in two separate 2×7 arrays with each array being disposed within chamber 436. The perimeter of an array marks the boundary between open space 438 of chamber 436 and thermal insulation 410. Exterior surfaces 437 of the walls of CPOX reactor units 408 corresponding to at least a portion of their CPOX reaction zones 409 are exposed within open space 438. If a hydrogen barrier is present, the hydrogen barrier can be the exposed, exterior surface of a CPOX reactor unit. Igniters 435 of the electrical resistance type, for example, rated at from 10 to 80 watts or greater, are disposed at opposite ends of chamber 436 where then radiant heat-producing elements 439 are positioned in proximity to, but in physical isolation from, exterior surfaces 437 of CPOX reactor units 408. Thermocouples 440 are disposed at the ends of chamber 436 opposite igniters 435 in order to monitor the temperature of CPOX reaction zones 409 and provide a reformer control input as described in connection with the control system illustrated in FIG. 3A. Operation of the igniters causes radiant heat to be transferred to, and through, the walls of one or more nearby CPOX reactor units whereby CPOX is initiated within the CPOX reaction zone of such reactor unit(s). The thermal radiation emitted from the CPOX reaction zone(s) of these nearby CPOX reactor units then can initiate CPOX within the reaction zones of the remaining CPOX reactor units within the array as illustrated by the wavy arrows in FIG. 4C.

The provision of a single, or two, or at most a few, igniter(s) that avoid direct contact with CPOX reactor units provides several advantages over a CPOX igniter system in which each CPOX reactor unit has its own physically attached or integrated igniter. While use of the latter ignition system is contemplated by the present teachings, identification of an inoperative igniter can be problematic and its removal and replacement without damage to the CPOX reactor unit of which it is a part and/or disturbance to other reactor units in the array can be difficult. Accordingly, a single (or a few) igniter(s) appropriately positioned within an array or plurality of CPOX reactor units can permit easy and simple identification and extraction from CPOX reformer of a failed or defective igniter, and its replacement with an operative igniter.

As shown in FIGS. 4C and 4D, where two igniters are used, each igniter to ignite a 2×7 array of CPOX reactor units, it can be advantageous to reverse the positions of igniter 435 and thermocouple 440 on one side of chamber 436 relative to the positions of igniter 435 and thermocouple 440 on the other side of the chamber, particularly where there can be significant thermal communication between the two chambers. Such an arrangement has been observed to result in a more rapid initiation of CPOX within the CPOX reaction zones of each separate array of CPOX reactor units. However, it should be understood that with the appropriately dimensioned and positioned CPOX reactor units within a chamber, a single igniter can be used to initiate CPOX within the CPOX reaction zones of the CPOX reactor units within the chamber.

Chamber 436 shown in FIGS. 4B, 4C and 4D (and present but not labeled in FIG. 4A) can contain a pressurized fluid such as a pressurized gas that can act as a hydrogen barrier as discussed herein. Chamber 436 can be an air-tight chamber. As depicted, chamber 436 is generally located to include in the chamber the CPOX reaction zone (e.g., the section of the gas permeable wall including a CPOX catalyst) of each of CPOX reactor units 408 as well as to include igniter 435 and thermocouple 440. As shown, although the chamber includes some of the CPOX reaction zone, one or more walls of the chamber can act as a hydrogen barrier where the CPOX reactor units traverse or extend through the walls, for example, above and below the interior of the chamber as shown. A pressurized fluid conduit such as a pressurized gas conduit (not shown) can provide operable fluid communication between the interior of the chamber and a source of pressurized or compressed fluid such as compressed air. The pressurization of the chamber can be controlled using the appropriate valve and pressure sensor assemblies to provide sufficient fluid pressure for an adequate hydrogen barrier.

Returning to FIG. 4E, enlarged manifold portion 450 of manifold 426 of reformer 400 illustrated in FIGS. 4A and 4B includes upper housing structure 455, lower housing structure 456, manifold chamber 429, gaseous CPOX reaction mixture (gas) distributor 427 and gas distributor outlets 430 in fluid communication, for example, gaseous flow communication, with inlets 431 of tubular CPOX reactor units 408. Inlet ends 457 of tubular CPOX reactor units 408 are firmly seated within cavities 458 formed within upper housing structure 455 and are engaged in gas-tight relationship therewith by O-ring gaskets 459. Gaseous CPOX reaction mixture flows through outlets 430 of gas distributor 427, through inlets 431 of tubular CPOX reactor units 408 and into CPOX reaction zones 409, where the gaseous CPOX reaction mixture undergoes gaseous phase CPOX conversion to a hydrogen-rich, carbon monoxide-containing effluent reformate exiting the reactor units at their outlet ends 460 through associated outlets 454.

As further shown in FIGS. 4F and 4G, gas permeable wall 451 of each tubular CPOX reactor unit 408 includes an inner surface 461, an outer surface 462, an open gaseous flow passageway 463 enclosed by gas-permeable wall 451, a portion of which constitutes CPOX reaction zone 409, and a catalytically effective amount of CPOX catalyst 464 supported within and/or comprising the structure of at least the section of gas-permeable wall 451 corresponding to second region 453 and CPOX reaction zone 409. As illustrated, to prevent or inhibit the loss of product hydrogen gas through gas-permeable wall 451, a hydrogen barrier 465 is attached to outer surface 462 of gas-permeable wall 451.

An open gaseous flow passageway can allow for the substantially unimpeded flow of gaseous CPOX reaction mixture and hydrogen-containing reformate therein, a structural feature of CPOX reactor units of the present teachings that contributes to the low back pressure which is characteristic of the operation of gaseous fuel CPOX reformers of the present teachings. In the operation of a gaseous fuel CPOX reformer in accordance with the present teachings, back pressures of not more than about 3 inches of water (0.0075 bar), for example, not more than about 2 inches of water, or not more than about 1 inch of water, are readily achievable.

As previously mentioned herein, to prevent or inhibit the loss of hydrogen by diffusion through and beyond a gas-permeable wall that forms a CPOX reactor unit, in some embodiments of CPOX reactor units, a hydrogen barrier is associated with, for example, attached to or adhered to, an outer or external surface of the gas-permeable wall for at least that portion of the length of the CPOX reactor unit corresponding to its CPOX reaction zone. Materials capable of functioning as effective hydrogen barriers should be thermally stable at the high temperatures typical of CPOX reactions and should be sufficiently dense to prevent or deter permeation or diffusion of reformate gases, particularly hydrogen, therethrough.

A variety of ceramic materials (inclusive of glasses and glass-ceramics) and metals meeting these requirements are known and are therefore suitable for providing hydrogen barrier. Specific materials for hydrogen barrier include, for example, aluminum, nickel, molybdenum, tin, chromium, alumina, recrystallized alumina, aluminides, alumino-silicates, titania, titanium carbide, titanium nitride, boron nitride, magnesium oxide, chromium oxide, zirconium phosphate, ceria, zirconia, mulite and the like, admixtures thereof and layered combinations thereof.

Where the nature of the material constituting a hydrogen barrier permits, the hydrogen barrier can be applied to at least that portion of an outer surface of a CPOX reactor unit wall corresponding to the CPOX reaction zone as a preformed layer, foil, film or membrane. The hydrogen barrier can be bonded to the wall with a refractory adhesive. Alternatively, a hydrogen barrier can be formed on an outer surface by employing any suitable deposition method, for example, any of the conventional or otherwise known ceramic-coating and metal-coating techniques such as spray coating, powder coating, brush coating, dipping, casting, co-extrusion, metalizing, and the like, and any of their many variations. A suitable range of thickness for a hydrogen barrier will depend primarily on the hydrogen permeability characteristics of the selected barrier material and the gas permeability characteristics of the wall enclosing the CPOX reaction zone, such thickness being determined by those skilled in the art. For many barrier materials and reactor wall structures, the thickness of a hydrogen barrier can vary from about 2 microns to about 15 microns, for example, between about 5 microns to about 12 microns.

In addition, a hydrogen barrier can be a pressurized fluid such as a pressurized gas associated with the external surface of a gas-permeable wall of a CPOX reactor unit, for example, at least the CPOX catalyst-containing wall section. With sufficient pressure, a pressurized fluid exterior to a CPOX reactor unit can create a barrier to prevent the loss of hydrogen through the gas-permeable wall that forms the CPOX reactor unit. Pressurized fluids typically are pressurized gases, such as inert gases (e.g., nitrogen) and/or air. The use of pressurized air as a hydrogen harrier has the additional advantage of oxygen diffusing from the exterior to the interior of the CPOX reactor unit, which diffused oxygen can adjust the O:C ratio of the gaseous CPOX reaction mixture about to and/or being reformed, particularly where such a hydrogen barrier is used and present around the CPOX reaction zone.

In certain embodiments, the CPOX reactor units can be located in an air-tight chamber but for their inlets and outlets thereby to permit pressurization of a fluid such as a gas in the environment exterior to the CPOX reactor units, which pressurized gas can create a hydrogen barrier associated with the external surfaces of the CPOX reactor units. In particular embodiments, because hydrogen is not produced in a CPOX reactor unit until the CPOX reaction zone, only the CPOX reaction zones of the CPOX reactor units are enclosed in an air-tight chamber that is pressurized with a fluid such as air. In embodiments where the CPOX reaction zone does not extend to the outlet of the CPOX reactor units, the beginning of the CPOX reaction zone to the outlet can be enclosed in an air-tight chamber to permit a pressurized gas to be used as a hydrogen barrier. In some designs, a chamber as described herein can encompass a portion of the CPOX reaction zone while another form of a hydrogen barrier can be present encompassing the remainder of the CPOX reaction zone.

In the embodiments where a chamber is used, such as an air-tight chamber, a conduit in fluid communication with the interior of the chamber can be used to pressurize the chamber with a fluid. For example, a pressurized fluid or gas conduit can provide operable fluid communication between the interior of the (air-tight) chamber and a source of pressurized or compressed fluid, such as a container a compressed gas such as compressed air.

As those skilled in the art will readily recognize and appreciate, the cross sectional configuration, number and dimensions of CPOX reactor units and the distances of their separation from each other measured from their geometric centers, or centroids, will be made to depend on the operational and mechanical performance specifications for a particular gaseous fuel CPOX reactor. In the case of a CPOX reactor unit of substantially uniform circular cross section, for example, CPOX reactor unit 408 illustrated in FIGS. 4C. 4F and 4G, the number of such CPOX reactor units, their length, their internal and external diameters (defining the thickness of their gas-permeable walls) and the location, length and thickness of hydrogen barriers attached to outer surfaces of the gas-permeable walls will be determined by, among other things, the hydrogen-producing capacity of the CPOX reformer, which in turn is a function of several factors including the type, amount (loading and distribution of CPOX catalyst within the gas-permeable walls), the characteristics of the porous structure of walls, characteristics influencing the gas-permeability of the walls, (and therefore affecting the CPOX reaction) such as pore volume (a function of pore size), the principal type of pore (mostly open, i.e., reticulated, or mostly closed, i.e., non-reticulated), and pore shape (spherical or irregular), the volumetric flow rates of CPOX reaction mixture, CPOX temperature, back pressure, and the like.

The desired mechanical performance characteristics of a particular gaseous fuel CPOX reformer will depend to a considerable extent on such factors as the thermal and mechanical properties of the material used for construction of the CPOX reactor units, the volume and morphology of the pores of the gas-permeable structure of the walls of the CPOX reactor units, the dimensions of the reactor units, particularly wall thickness, and related factors.

For a gaseous fuel CPOX reformer to suitably function, the gas permeability property of the catalytically-active wall structure of a tubular CPOX reactor unit enclosing a gaseous phase CPOX reaction zone should be such as to allow gaseous reformable fuel to enter freely and diffuse through such wall structure thereby making effective contact not only with surface CPOX catalyst but interior CPOX catalyst as well, if present. It should be noted that CPOX reactor unit wall structures having limited gas permeability for the vaporized reformable fuel can be mass transport limited so as to impede significantly CPOX conversion of the gaseous reformable fuel to hydrogen-rich reformate. By contrast, catalytically-active reactor wall structures of suitable gas permeability promote CPOX conversion of the gaseous reformable fuel and selectivity for hydrogen-rich reformates of desirable composition.

Guided by the present teachings and employing known and conventional testing procedures, those skilled in the art can readily construct CPOX reactor units having catalytically-active wall structures exhibiting optimal gas permeability properties for a particular gaseous reformable fuel to be processed.

Materials from which the catalytically-active wall structure of a CPOX reaction zone of a tubular CPOX reactor unit can be fabricated are those that enable such wall structures to remain stable under the high temperatures and oxidative environments characteristic of CPOX reactions. Conventional and otherwise known refractory metals, refractory ceramics, and combinations thereof can be used for the construction of the catalytically-active wall structure of a CPOX reaction zone. Some of these materials, for example, perovskites, also can possess catalytic activity for partial oxidation and therefore can be useful not only for the fabrication of the catalytically-active wall structure of a CPOX reaction zone but also can supply part or even all of the CPOX catalyst for such structure.

In some embodiments, at least the section of the wall of a CPOX reaction zone or including a CPOX catalyst of a CPOX reactor unit can be made of or can include a perovskite. For example, greater than about 20%, greater than about 30%, greater than about 40%, greater than about 50%, greater than about 60%, greater than about 70%, greater than about 80%, or greater than about 90% by weight of such wall section can be perovskite. Such a wall section can be made entirely of a perovskite, or the entire wall of a CPOX reactor unit can be made of a perovskite or can include the percentages of a perovskite described herein. The balance of the materials of the section of the wall at least corresponding to the CPOX reaction zone can include at least one component selected from metals, ceramics, refractory binders, and CPOX catalysts other than a perovskite.

The perovskite can be at least one member selected from $LaNiO_3$, $LaCoO_3$, $LaCrO_3$, $LaFeO_3$ and $LaMnO_3$. Perovskites can include lanthanum strontium manganite, lanthanum strontium ferrite, lanthanum strontium cobalt ferrite, lanthanum calcium manganite, lanthanum strontium chromiite, lanthanum strontium gallate magnesite, and combinations thereof. When present as a catalyst, the perovskite can be $La_{1-x}Ce_xFe_2O_3$, $LaCr_{1-y}Ru_yO_3$, $La_{1-x}Sr_xAl_{1-y}Ru_yO_3$ and $La_{1-x}Sr_xFe_2O_3$, including combinations thereof, where x and y are numbers ranging from 0.01 to 0.5. In addition, other appropriately transition metal-doped perovskites can be used in the practice of the present teachings.

Among the useful refractory metals are titanium, vanadium, chromium, zirconium, molybdenum, rhodium, tungsten, nickel, iron and the like, their combinations with each other and/or with other metals and/or metal alloys, and the like. Refractory ceramics are a class of materials for the construction of the catalytically-active wall structures due to their relatively low cost compared to many refractory metals and metal alloys that are also useful for this purpose. The comparative ease with which such ceramics can be formed into tubular gas-permeable structures of fairly reproducible pore type employing known and conventional pore-forming procedures and the generally highly satisfactory structural/mechanical properties of ceramics (including coefficients of thermal expansion and thermal shock performance) and resistance to chemical degradation make them attractive materials. Suitable refractory ceramics for the construction of a CPOX reaction zone (which as previously stated, can include the entire wall structure of a CPOX reactor unit) include, for example, perovskites, spinels, magnesia, ceria, stabilized ceria, silica, titania, zirconia, stabilized zirconia such as alumina-stabilized zirconia, calcia-stabilized zirconia, ceria-stabilized zirconia, magnesia-stabilized zirconia, lanthana-stabilized zirconia and yttria-stabilized zirconia, zirconia stabilized alumina, pyrochlores, brownmillerites, zirconium phosphate, silicon carbide, yttrium aluminum garnet, alumina, alpha-alumina, gamma-alumina, beta-alumina, aluminum silicate, cordierite. $MgAl_2O_4$, and the like, various ones of which are disclosed in U.S. Pat. Nos. 6,402,989 and 7,070,752, the entire contents of which are incorporated by reference herein; and, rare earth aluminates and rare earth gallates various ones of which are disclosed in U.S. Pat. Nos. 7,001.867 and 7,888,278, the entire contents of which are incorporated by reference herein.

In general, the total or overall fuel conversion capacity of a CPOX reformer of a given design will be the sum of the fuel conversion capabilities of its individual CPOX reactor units. The minimum distance between adjacent CPOX reactor units will be such that in the steady-state mode of operation of the reformer, the temperature of the reactor units does not exceed a predetermined, or preset, maximum, and the maximum distance between adjacent CPOX reactor units is that distance beyond which the CPOX reaction fails to be initiated within one or more reactor units during a start-up mode of operation of the gaseous fuel CPOX reformer or the temperature within one or more CPOX reactor units falls below a predetermined, or preset, minimum intended for the steady-state mode of operation of the reformer. The minimum and maximum distances between adjacent CPOX reactor units readily can be determined for a given reformer section design employing routine testing methods.

The present teachings contemplate the use of any of the heretofore known and conventional CPOX catalysts (including catalyst systems), methods of incorporating catalyst within a porous substrate or support, specifically, a gas-permeable wall of the a CPOX reactor unit, and patterns of catalyst distribution including, but not limited to, catalyst confined to a particular section of a wall, catalyst loading increased along the length of a reactor unit and/or decreased from an inner surface of a wall to its outer surface, CPOX catalyst that varies in composition along the length of the reactor unit, and similar variants. Thus, for example, increasing catalyst loading within a wall of a CPOX reactor unit from the start of a CPOX reaction zone to, or near, the end thereof can be helpful in maintaining a constant CPOX reaction temperature with this zone.

Among the many known and conventional CPOX catalysts that can be utilized herein are the metals, metal alloys, metal oxides, mixed metal oxides, perovskites, pyrochlores, their mixtures and combinations, including various ones of which are disclosed, for example, in U.S. Pat. Nos. 5,149, 156; 5,447,705; 6,379,586; 6,402,989; 6,458,334; 6,488, 907; 6,702,960; 6,726,853; 6,878,667; 7,070,752; 7,090, 826; 7,328,691; 7,585,810; 7,888,278; 8,062,800; and, 8,241,600, the entire contents of which are incorporated by reference herein.

While numerous highly active noble metal-containing CPOX catalysts are known and as such can be useful herein, they are generally less used than other known types of CPOX catalysts due to their high cost, their tendency to sinter at high temperatures and consequently undergo a reduction in catalytic activity, and their proneness to poisoning by sulfur.

Perovskite catalysts are a class of CPOX catalyst useful in the present teachings as they are also suitable for the construction of the catalytically-active wall structures of a CPOX reactor unit. Perovskite catalysts are characterized by the structure $ABX_3$ where "A" and "B" are cations of very different sizes and "X" is an anion, generally oxygen, that bonds to both cations. Examples of suitable perovskite CPOX catalysts include $LaNiO_3$, $LaCoO_3$, $LaCrO_3$, $LaFeO_3$ and $LaMnO_3$.

A-site modification of the perovskites generally affects their thermal stability while B-site modification generally affects their catalytic activity. Perovskites can be tailor-modified for particular CPOX reaction conditions by doping at their A and/or B sites. Doping results in the atomic level dispersion of the active dopant within the perovskite lattice thereby inhibiting degradations in their catalytic performance. Perovskites also can exhibit excellent tolerance to sulfur at high temperatures characteristic of CPOX reforming. Examples of doped perovskites useful as CPOX catalysts include $La_{1-x}Ce_xFeO_3$, $LaCr_{1-y}Ru_yO_3$, $La_{1-x}Sr_xAl_{1-y}Ru_yO_3$ and $La_{1-x}Sr_xFeO_3$ wherein x and y are numbers from 0.05 to 0.5, for example, from 0.05 to 0.2, depending on the solubility limit and cost of the dopants.

As previously discussed in connection with FIG. 4F, a CPOX reactor unit can include a first, upstream region that is substantially devoid of CPOX catalyst and can extend from its inlet end to a second, downstream region that contains a CPOX catalyst. The second, downstream region typically extends from the end of the first region to its reformate effluent outlet, although the amount of catalyst near the outlet can decline. The length of these regions relative to the entire length of the CPOX reactor unit can vary considerably. Thus, for example, a first region can extend from about 20% to about 60%, for example, from about 30% to about 40% or about 50%, of the length of a CPOX reactor unit, with a second region extending the remainder of the length of the CPOX reactor unit. As explained in connection with the description of CPOX reformer 400 of FIG. 4A, during steady-state operation of CPOX reactor unit 400, first region 452 remains at a considerably lower temperature than second region 453 (corresponding to CPOX reaction zone 409) allowing manifold housing 428 of manifold 426 of FIG. 4A to be fabricated from any of numerous kinds of low cost, readily moldable thermoplastic or thermoset resins.

CPOX reactor unit 408, in addition to the circular cross section shown in FIG. 4G, can assume other cross sectional configurations such as those illustrated in FIGS. 4H and 4I. FIG. 4H illustrates a CPOX reactor unit having an alternating concave-convex, or bilobate, cross section. CPOX reactor units having such a cross sectional configuration can be especially advantageous where their outlet sections are to be joined to, or mated with, similarly configured tubular solid oxide fuel cell (SOFC) units as in the SOFC fuel cell assembly of co-pending, commonly assigned U.S. Patent Application Publication No. 2013/0230787, by Finnerty et al., the entire contents of which are incorporated by reference herein for all purposes.

Alternatively or in combination with direct connection of a CPOX reactor unit to a tubular fuel cell unit, the outlets of two or more CPOX reactor units of a multi-tubular CPOX reformer can be in fluid communication with each other (and with additional outlets of CPOX reactor units) and the hydrogen-rich reformate from the outlets can be combined prior to introduction into a fuel cell. For example, the hydrogen-rich reformate effluent from two or more CPOX reactor units can be combined in a manifold or similar device and/or one or more conduits and then introduced into a fuel cell, which could be a multi-tubular fuel cell or a single fuel cell unit. Accordingly, a CPOX reformer of the present teachings can be adapted to various applications depending on its end use, for example, providing hydrogen-rich reformate to a single or multi-tubular fuel cell unit.

Centrifugal blower system 402 of gaseous CPOX reformer 400, shown in greater detail in FIGS. 4J and 4K, disclosed in co-pending, commonly assigned U.S. Patent Application Publication No. 2012/0328969, by DeWald et al., the entire contents of which are incorporated by reference herein for all purposes. Among its other advantages, a centrifugal blower system can possess the ability to make rapid adjustments in the volume of air introduced into a conduit and/or in the rate of flow of the gaseous fuel-air mixture to CPOX reactor units in response to changes in the demand for product hydrogen-rich reformate that single centrifugal blowers of comparable air flow capacity are incapable of providing, as explained herein, without resorting to blowers of relatively high power consumption.

Single centrifugal blowers such as those utilized to provide gas flows for the operation of known and conventional reformers require suitable control of the full range of motor revolutions per minute (rpm) in order to meet fluctuating gas flow demands. Depending on the target gas flow requirements for a particular mode of operation of a CPOX reformer, optimum performance of a single blower for meeting these requirement can involve employing a blower having an impeller of relatively small size driven at relatively high rpm, for example, about 20.000 rpm and above, or a blower having an impeller of relatively large size driven at relatively low rpm, for example, below about 20,000 rpm and more commonly, below about 10,000 rpm. The first arrangement, i.e., a single blower having a relatively small impeller driven at relatively high rpm, requires a more powerful and specialized motor which of necessity will draw a correspondingly greater amount of electrical power for its operation. The second arrangement, i.e., a single blower having a relatively large impeller driven at relatively low rpm. can make control and fine tuning of the blower output more difficult due to the greater inertia of a large impeller.

To prevent overshooting of the target pressure and gas flow requirements for a gaseous fuel CPOX reformer, a single blower having a relatively high inertia impeller must be overdamped when tuning the blower for its expected range of gas pressure and flow capacity. The effect of this overdamping to compensate for the relatively high inertia of the impeller is to cause the blower to be slow in responding to changing, and often rapidly changing, gas flow requirements. This characteristically slow response of a single centrifugal blower having a relatively high inertia impeller can require a more complicated control system for satisfactorily responding to fluctuations in gas flow demand.

Utilizing a centrifugal blower system to drive gas flows within a CPOX reformer can enable the system to benefit from both low inertia impellers for control as well as low drive motor rpm and power draw to meet quickly target gas flow and pressure requirements. Controlling one or more blower units in an interconnected series of blowers such as a centrifugal blower system to provide a major portion of the target gas pressure and gas flow, for example, about 60% to about 90% of the target gas pressure and gas flow, can enable the remainder of the target gas pressure and gas flow to be provided by one or more other blower units in the system. The result of splitting the task of providing target gas flows and pressures to a CPOX reformer between at least two integrated, i.e., interconnected, centrifugal blowers as in a dual centrifugal blower system results in such flows and pressures being reached in less time and with greater accuracy than is possible with a single centrifugal blower unit. Additionally, the power draw and noise level can be low in a centrifugal blower system because the blower impellers do not require high rpm for their operation.

As shown in FIGS. 4J and 4K, centrifugal blower system 402 includes first centrifugal blower unit 486 connected to second centrifugal blower unit 487 through duct 488. First blower unit 486 includes casing 489 having axial inlet 490 and radial outlet 491, impeller 492 disposed within casing 489 for drawing ambient air at a first pressure into axial inlet 490 and expelling air at a second higher pressure through radial outlet 491, and electric motor 493 for driving impeller 492. Second blower unit 487 includes casing 494 and, as shown by the cutaway section of duct 488 in FIG. 4J, impeller 495 disposed within casing 494 and driven by electrical motor 496, and axial inlet 497 for receiving gas discharged from outlet 491 of first blower unit 486. Second blower unit 487 further includes radial outlet 498 and outlet gas stream housing 499, the discharge end 484 of which can be connected to one end of a conduit, for example, conduit 404 of gaseous fuel CPOX reformer 400 of FIG. 4A, as indicated by the dotted lines.

The arrows in FIGS. 4J and 4K indicate the general direction of the ambient air through the radial outlet of each blower unit in the series of blowers constituting centrifugal blower system 402. As shown, for example, in FIG. 4J, the trajectory of the ambient air stream expelled through outlet 491 of first blower unit 486 and the trajectory of the ambient air stream expelled through outlet 498 of second blower unit 487 are not parallel to their respective outlets but are at some angle thereto. By arranging the geometry of duct 488 to receive the ambient air stream discharged through outlet 491 in such a manner that the stream remains approximately parallel to the interior walls of the duct, it can be possible to prevent or reduce the turbulence that would otherwise occur were the stream to impinge upon these walls. Turbulence can be advantageously minimized or avoided so as to reduce or eliminate it as a source of back pressure in a centrifugal blower system. For this same reason, it can be advantageous to arrange the angle of gas stream housing 499 so that its interior walls will be approximately parallel to the trajectory of the ambient air discharged through outlet 498 of second blower unit 487. The optimum geometry of the interior walls of a duct relative to the trajectory of its gas stream and the angle of offset of a gas stream housing can be readily determined for a given centrifugal blower system employing routine experimentation. In centrifugal blower system 402, interior, or guiding, surfaces of duct 488 and interior, or guiding, surfaces of gas stream housing 499 can be pitched at an angle $\alpha$ of from about 12° to about 20°, for example, from about 14° to about 18°, relative to outlets 491 and 498.

Figure 5:
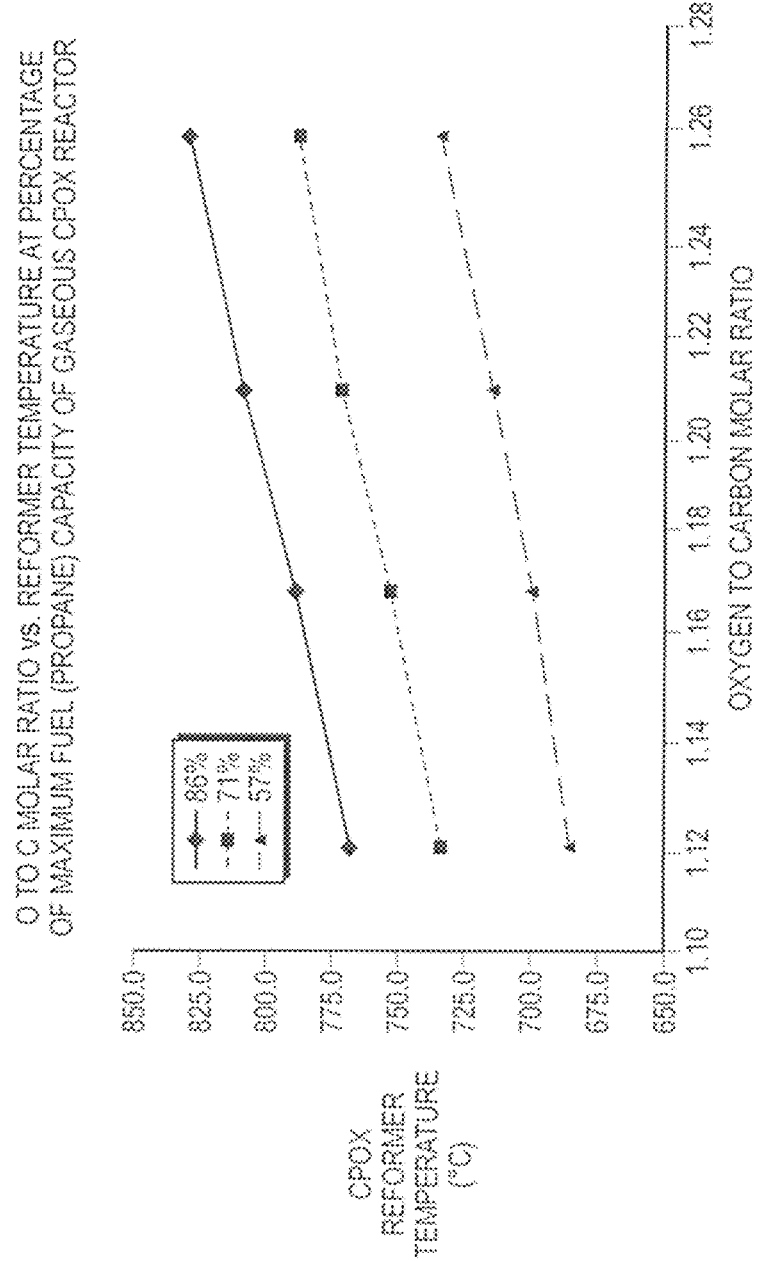
FIG. 5 presents graphical data showing the relationship between the molar ratio of oxygen to carbon of the CPOX reaction mixture on the CPOX reaction temperature within a gaseous fuel CPOX reformer of the present teachings at varying percentages of maximum fuel (propane) conversion capacity when the reformer is operating in the steady-state mode.

FIG. 5 presents graphical data demonstrating the relationship between the oxygen (O) to carbon (C) molar ratio of propane-air CPOX reaction mixtures and CPOX reaction temperature. As the data show, as the O to C molar ratio of the CPOX reaction mixture is gradually reduced, i.e., as the reaction mixture is adjusted from a relatively carbon-lean one to a relatively carbon-rich one, CPOX reaction temperature declines. These data hold several implications for optimized operations of a gaseous fuel CPOX reformer in accordance with the present teachings.

To promote rapid heating of CPOX catalyst and, consequently, the onset of the gaseous phase CPOX reaction, gaseous CPOX reaction mixtures having higher O to C molar ratios (i.e., fuel-lean reaction mixtures) can be utilized during the start-up mode of operation of the reformer. The higher operating temperatures associated with fuel-lean CPOX reaction mixtures can facilitate a more rapid increase in CPOX catalyst temperature and reduced time to steady-state operation. Additionally, a fuel-lean ratio tends to help inhibit coke formation before the CPOX catalyst has attained its optimum temperature and become fully activated. Once the CPOX catalyst has reached a temperature of about 650° C. and above, the O to C molar ratio can be reduced as fuel flow is increased. Reducing the O to C molar ratio lowers the catalyst temperature and can enable more fuel to be processed without losing thermal control of the CPOX reactor units and in turn, the fuel vaporizer unit. The opposite action can be taken for the shut-down operation. i.e., fuel flow is reduced at a maintained O to C molar ratio. As the temperature of the CPOX reaction zones of the CPOX reactor units begin to approach or fall below a temperature resulting in coke formation, for example, below about 650° C. the O to C molar ratio can be increased to prevent or minimize coking as the CPOX catalyst deactivates. Typically, the CPOX reformer can be shut down when the temperature of the CPOX reaction mixture falls below about 500° C. The flow of oxygen-containing gas can be continued for up to about 15 to 20 seconds or so after fuel flow has been discontinued. Such a shut-down procedure can allow for removal of fuel from the reformer that can be contained within a conduit or a section of fuel line between a fuel control valve and locus of introduction of the fuel into the conduit. This control characteristic can be influenced by various reformer components including the particular delivery system and controller unit components utilized in a specific reformer design.

The O to C molar ratio of the fuel-air CPOX reaction mixture can be controlled during the operation to tailor its output thermal conditions, with the understanding that changing the O to C molar ratio can result in changes to the quality and/or composition of the reformate. There is a range of O to C molar ratio that shifts from fuel-lean to fuel-rich as CPOX temperature increases above about 650° C. Different CPOX catalysts can affect the operational windows and CPOX temperatures. Additionally, different fuels (gaseous or liquid) can change the CPOX temperatures depending upon the efficiency of the reforming reactions.

Those skilled in the art, taking into account the various embodiments of the gaseous fuel CPOX reformers described herein and the principles of operation of the same, by employing routine experimental procedures can readily optimize the design of a particular CPOX reformer of desired liquid reformable fuel conversion capacity, structural characteristics, and mechanical properties in accordance with the present teachings.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

The invention claimed is:

1. A gaseous fuel CPOX reformer comprising:
   an array of spaced-apart CPOX reactor units, each CPOX reactor unit comprising an elongate tube having a gas-permeable wall with an internal surface and an external surface, the gas-permeable wall enclosing an open gaseous flow passageway and defining an inlet and an outlet of the CPOX reactor unit, the open gaseous flow passageway being a hollow bore extending from the inlet to the outlet of the CPOX reactor unit, wherein a CPOX reactor unit is in thermal communication with at least the adjacent CPOX reactor unit(s) in the array, and
   a CPOX catalyst disposed within and/or comprising the structure of at least a section of the gas-permeable wall comprises a CPOX catalyst; and
   an igniter in thermal communication with the CPOX catalyst at least a section of the gas permeable wall comprising a CPOX catalyst of at least one CPOX reactor unit.

2. The gaseous fuel CPOX reformer of claim 1, wherein a hydrogen barrier is associated with the external surface of at least the CPOX catalyst-containing wall section of a CPOX reactor unit.

3. The gaseous fuel CPOX reformer of claim 2, wherein the hydrogen barrier comprises pressurized air.

4. The liquid CPOX reformer of claim 2 wherein the hydrogen barrier is attached or adhered to an outer layer or external surface of the gas-permeable wall for at least that portion of the length of a CPOX reactor unit corresponding to its CPOX reaction zone.

5. The liquid fuel CPOX reformer of claim 4 wherein the material of the hydrogen barrier is selected from the group consisting of aluminum, nickel, molybdenum, tin, chromium, alumina, recrystallized alumina, aluminides, alumino-silicates, titania, titanium carbide, titanium nitride, boron nitride, magnesium oxide, chromium oxide, zirconium phosphate, ceria, zirconia, mulite, admixtures thereof and layered combinations thereof.

6. The gaseous fuel CPOX reformer of claim 1, wherein the maximum distance between adjacent CPOX reactor units is that distance beyond which the heat from an operating CPOX reactor unit operating at a predetermined minimum temperature fails to initiate a CPOX reaction in an adjacent CPOX reactor unit and/or during a steady-state mode of operation, the temperature of the array of spaced-apart CPOX reactor units falls below a predetermined minimum array temperature; and the minimum distance between adjacent CPOX reactor units is that distance below which the temperature at an outlet of a CPOX reactor unit is greater than a predetermined maximum temperature.

7. The gaseous fuel CPOX reformer of claim 6, wherein the predetermined maximum temperature is a temperature that is tolerable by an inlet of a fuel cell stack in thermal and fluid communication with an outlet of a CPOX reactor unit.

8. The gaseous fuel CPOX reformer of claim 6, wherein the predetermined maximum temperature is about 900° C.

9. The gaseous fuel CPOX reformer of claim 6, wherein the predetermined minimum array temperature is about 600° C.

10. The gaseous fuel CPOX reformer of claim 1, comprising a source of gaseous reformable fuel in fluid communication with an inlet of at least one CPOX reactor unit.

11. The gaseous fuel CPOX reformer of claim 1, comprising more than one igniter, wherein each igniter is positioned in thermal communication with a CPOX catalyst of at least one CPOX reactor unit.

12. The gaseous fuel CPOX reformer of claim 1, wherein the CPOX catalyst-containing wall section comprises a ceramic.

13. A method of CPOX reforming a gaseous reformable fuel to a hydrogen-rich reformate, the method comprising:

introducing a gaseous CPOX reaction mixture comprising a gaseous reformable fuel into inlets of CPOX reactor units, wherein the CPOX reactor units form an array of spaced-apart CPOX reactor units, each CPOX reactor unit comprising an elongate tube having a wall with an internal surface and an external surface, the wall enclosing an open gaseous flow passageway and defining an inlet and an outlet of the CPOX reactor unit, the open gaseous flow passageway being a hollow bore extending from the inlet to the outlet of the CPOX reactor unit,
  wherein a CPOX reactor unit is in thermal communication with at least the adjacent CPOX reactor unit(s) in the array,
  a CPOX catalyst disposed within and/or comprising the structure of at least a section of the wall comprises a CPOX catalyst, and
  the CPOX catalyst-containing wall section is gas-permeable to allow gaseous CPOX reaction mixture to diffuse therein and product hydrogen-rich reformate to diffuse therefrom;
initiating catalytic partial oxidation of the gaseous CPOX reaction mixture by an igniter in thermal communication with the CPOX catalyst to begin production of a hydrogen-rich reformate in at least one CPOX reactor unit; and
maintaining catalytic partial oxidation of the gaseous CPOX reaction mixture in the at least one CPOX reactor unit.

14. The method of claim 13, wherein a hydrogen barrier is associated with the external surface of at least the CPOX catalyst-containing wall section of a CPOX reactor unit.

15. The method of claim 13, wherein the maximum distance between adjacent CPOX reactor units is that distance beyond which the heat from an operating CPOX reactor unit operating at a predetermined minimum temperature fails to initiate a CPOX reaction in an adjacent CPOX reactor unit and/or during a steady-state mode of operation, the temperature of a CPOX reactor unit falls below a predetermined minimum array temperature; and the minimum distance between adjacent CPOX reactor units is that distance below which the temperature at an outlet of a CPOX reactor unit is greater than a predetermined maximum temperature.

16. The method of claim 13, wherein initiating catalytic partial oxidation comprises:
  initiating a CPOX reaction in one CPOX reactor unit;
  transferring the heat from the CPOX reaction to an adjacent CPOX reactor unit to initiate a CPOX reaction therein; and
  repeating transferring the heat to initiate a CPOX reaction in each of the CPOX reactors of the array.

17. The method of claim 13, wherein initiating catalytic partial oxidation comprises initiating more than a single igniter to initiate catalytic partial oxidation of the gaseous CPOX reaction mixture in each of the CPOX reactor units.

18. The method of claim 13, wherein maintaining catalytic partial oxidation of the gaseous CPOX reaction mixture comprises transferring heat among the CPOX reactor units to maintain a predetermined minimum array temperature.

19. The method of claim 18, wherein the predetermined minimum array temperature is substantially uniform across the array of CPOX reactor units.

20. The method of claim 13, comprising varying the oxygen (O) to carbon (C) ratio of the gaseous CPOX reaction mixture during operation of the gaseous fuel CPOX reformer.

21. The method of claim 13, where the gaseous CPOX reaction mixture consists essentially of a gaseous reformable fuel and an oxygen-containing gas.

22. The method of claim 13, wherein the gaseous CPOX reaction mixture consists of a gaseous reformable fuel and an oxygen-containing gas.

23. The method of claim 13, wherein the gaseous CPOX reaction mixture does not comprise a vaporized liquid reformable fuel.

24. A method of CPOX reforming of gaseous reformable fuel to produce hydrogen-rich reformate, the method comprising:
  a) in a start-up mode:
    (i) introducing gaseous CPOX reaction mixture comprising oxygen-containing gas and gaseous reformable fuel into the inlet of each of a plurality of spaced-apart CPOX reactor units, each reactor unit comprising an elongate tube having an inlet for gaseous CPOX reaction mixture, an outlet for hydrogen-rich reformate, a wall with internal and external surfaces, the wall enclosing an open gaseous flow passageway, the open gaseous flow passageway being a hollow bore extending from the inlet to the outlet of the CPOX reactor unit, with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining stable under CPOX reaction conditions, and
    (ii) initiating CPOX of the gaseous CPOX reaction mixture by an igniter in thermal communication with the CPOX catalyst within the CPOX reaction zones of the CPOX reactor units thereby commencing the production of gaseous hydrogen-rich reformate; and,
  b) in a steady-state mode:
    (iii) introducing gaseous CPOX reaction mixture into the inlets of the CPOX reactor, and
    (iv) discontinuing CPOX initiating step (ii) prior to, during or following step (iii) while maintaining the CPOX reaction within the CPOX reaction zones of the CPOX reactor units thereby continuing the production of gaseous hydrogen-rich reformate.

25. A method of CPOX reforming of gaseous reformable fuel to produce hydrogen-rich reformate, the method comprising:
  a) in a start-up mode:
    (i) introducing oxygen-containing gas into a conduit for routing gas toward the inlet of each of a plurality of CPOX reactor units, the conduit comprising an inlet for oxygen-containing as, an inlet for gaseous reformable fuel and an outlet for gaseous CPOX reaction mixture in gaseous flow communication with the inlets of the CPOX reactor units, each CPOX reactor unit comprising an elongate tube having an inlet for gaseous CPOX reaction mixture, an outlet for hydrogen-rich reformate, a wall with internal and external surfaces, the wall enclosing an open gaseous flow passageway, the open gaseous flow passageway being a hollow bore extending from the inlet to the outlet of the CPOX reactor unit, with at least a section of the wall having CPOX catalyst disposed therein and/or comprising its structure, such catalyst-containing wall section and open gaseous flow passageway enclosed thereby defining a gaseous phase CPOX reaction zone, the catalyst-containing wall section being gas-permeable to allow gaseous CPOX reaction mixture to diffuse therein and product hydrogen-rich reformate to diffuse therefrom while remaining structurally stable under CPOX reaction conditions, (ii) introducing gaseous reformable fuel into the conduit, the gaseous reformable fuel combining with oxygen-containing gas from step (i) to provide gaseous CPOX reaction mixture, (iii) introducing gaseous CPOX reaction mixture from step (ii) into the inlets of the CPOX reactor units, and (iv) initiating CPOX of the gaseous CPOX reaction mixture by an igniter in thermal communication with the CPOX catalyst within the CPOX reaction zones of the CPOX reactor units thereby commencing the production of hydrogen-rich reformate; and, b) in a steady-state mode:

(v) introducing oxygen-containing gas into the conduit, (vi) introducing gaseous reformable fuel into the conduit, the gaseous reformable fuel combining with oxygen-containing gas from step (v) to provide gaseous CPOX reaction mixture, (vii) introducing gaseous CPOX reaction mixture from step (vi) into the inlets of the CPOX reactor units, and (viii) discontinuing CPOX initiating step (iv) prior to, during or following step (vii) while maintaining the CPOX reaction within the CPOX reaction zones of the CPOX reactor units thereby continuing the production of hydrogen-rich reformate.

* * * * *